United States Patent [19]

Mihara

[11] Patent Number: 4,457,595
[45] Date of Patent: Jul. 3, 1984

[54] LARGE RELATIVE APERTURE TELEPHOTO LENS SYSTEM

[75] Inventor: Shinichi Mihara, Hachiooji, Japan

[73] Assignee: Olympus Optical Co., Ltd., Tokyo, Japan

[21] Appl. No.: 401,949

[22] Filed: Jul. 26, 1982

[30] Foreign Application Priority Data

Aug. 12, 1981 [JP] Japan .................................. 56-125218

[51] Int. Cl.³ .............................................. G02B 13/02
[52] U.S. Cl. .................................... 350/454; 350/457
[58] Field of Search ............... 350/454, 455, 456, 457, 350/463, 469, 470, 474, 475

[56] References Cited

U.S. PATENT DOCUMENTS 3,854,797 12/1974 Yokota .
4,045,128 8/1977 Momiyama .
4,157,211 6/1979 Tanaka et al. ....................... 350/427
4,176,913 12/1979 Nakamura et al. .

*Primary Examiner*—John K. Corbin
*Assistant Examiner*—Paul M. Dzierzynski
*Attorney, Agent, or Firm*—Cushman, Darby & Cushman

[57] ABSTRACT

A large relative aperture telephoto lens system comprising a first converging lens group consisting of four positive, positive, negative and positive lens components, a diverging lens group consisting of two negative cemented doublets, and a second converging lens group consisting of a positive lens component and a cemented doublet composed of a negative lens element and a positive lens element.

Said lens system is so adapted as to perform focusing and correction of aberrations by displacing the two negative lens components in said diverging lens group and said second lens group as a whole independently along the optical axis while changing relative airspaces, maintains high performance within a range from infinity to short distances and assures high operability for focusing.

10 Claims, 22 Drawing Figures

LARGE RELATIVE APERTURE TELEPHOTO LENS SYSTEM

BACKGROUND OF THE INVENTION (a) Field of the Invention

The present invention relates to a telephoto lens system having a large aperture ratio and a rear focusing system (a system fo focusing by shifting a rear lens group) comprising a floating means (shifting specific lens for correcting aberration independently of other lenses in a lens system).

(b) Description of the Prior Art

Recently, large aperture ratios such as F 2.0 or F 2.8 and high performance as well as shortening of minimum photographing distances are desired even for telephoto lens systems having focal lengths on the order of 200 mm to 300 mm. Further, lens systems which are light in weight and assure high operability for focusing are desired.

As a prior example designed to meet the desire, there exists a lens system which comprises lenses made of a glass material having an especially low dispersing power (very large Abbe's number) and adopts an internal focusing system which performs focusing by shifting certain lens(es) in the lens system. The above-mentioned internal focusing system can be contrived in various types. As lens systems adopting known internal focusing systems, there exist those disclosed by Japanese unexamined published patent No. 139732/50 (prior example No. 1), Japanese unexamined published patent No. 134425/53 (prior example No. 2) and Japanese unexamined published patent No. 17723/49 (prior example No. 3). Among these lens systems, prior example No. 1 is a lens system in which only one lens component is movable in its rear lens group. Prior example No. 2 is a lens system in which two or more lens components are movable with relative airspaces reserved therebetween kept unchanged. Prior example No. 3 is a lens system comprising a floating means in which two lens components are movable, relative airspace between said lens components is variable and one of said lens components has an aberration correcting function.

These prior examples adopting the internal focusing systems have satisfactory operability since the lens components to be shifted for focusing have low weights and are displaced for short distances. Further, these prior examples made it possible to focus the lens systems on an object located at short distance at which photographing magnification is apploximately 1/10. However, these lens systems adopting the internal focusing systems have a common drawback that they allow remarkable variations of aberrations in focusing, thereby making it difficult to maintain stable performance free from variations of aberrations within a range from infinite distance to short distance, and provide deteriorated images when focused on an object at a short distance though they provide satisfactory images when focused at infinite distance. Out of the above-mentioned examples, prior example No. 1 allows remarkable variations of aberrations when the movable lens component having aberration by itself is shifted for focusing. Prior example No. 2 is a lens system having a basic composition consisting of a converging lens group, a diverging lens group and another converging lens group which are arranged consecutively from the object side, and designed for focusing by shifting the diverging lens groups integrally. In case of this lens system, variation of aberrations cannot be suppressed sufficiently though it permits suppressing variation of aberrations to a certain degree by selecting a proper combination of lens shapes. Therefore, it is obliged to sacrifice more or less the performance for photographing an object at infinite distance used frequently in practice in order to maintain satisfactory aberrations in photographing an object at a short distance, especially image plane characteristic. The term "image plane characteristic" used above has the meaning described below:

Optimum offaxial image plane is determined mainly by astigmatism (curvature of field), whereas optimum paraxial image plane is determined by spherical aberration. Therefore, an image plane which is satisfactory from the center to marginal portions can be obtained by correcting aberrations so as to coincide these two image planes with each other. However, it is practically required to consider also influences due to coma and so on. For example, it is dependent on conditions of coma and so on whether the offaxial image plane should desirably be on the positive or negative side of the paraxial image plane when the optimum offaxial image plane is not coincident with the optimum paraxial image plane. It is therefore desirable to coincide image planes as precisely with each other as possible based on overall consideration of conditions of coma and so on. Improving "image plane characteristic" means coinciding the image planes precisely with each other as described above.

In case of the prior example No. 3, variations of spherical aberration and paraxial chromatic aberration cannot be minimized sufficiently though they can be minimized by selecting refractive indices and Abbe's numbers of the lens components comprised in the focusing lens groups and other parameters. Adjustment of the airspaces for correcting aberrations is effective to suppress variation of spherical aberration but does not serve for correcting astigmatism.

As is understood from the foregoing descriptions, the lens systems designed for focusing by displacing one or two movable lens components (lens system comprising 0 or 1 airspace to be adjusted for correcting aberrations) can suppress marginal amount or zonal amount of spherical aberration, but hardly permits maintaining satisfactory image plane characteristic for all objects located from infinite to short distances. As a result, the operability for focusing on an object at a short distance corresponding to a magnification of 1/10 is nearly insignificant.

SUMMARY OF THE INVENTION

A general object of the present invention is to provide a large relative aperture telephoto lens system comprising a first converging lens group, a diverging lens group and a second converging lens group, and designed for focusing and correcting aberrations by shifting two lens components in said diverging lens group and said second converging lens group as a whole independently while adjusting the relative airspaces.

The large relative aperture telephoto lens system according to the present invention comprises a first converging lens group I, a diverging lens group II and a second converging lens group III as shown in FIG. 1. Said first converging lens group I comprises a positive lens component, a positive lens component, a negative lens component and a positive lens component which are arranged consecutively from the object side. Said diverging lens group II comprises two negative cemented doublets, and arranged with a narrow airspace reserved from said first converging lens group. Further, said second converging lens group III comprises a positive lens component, a negative lens component and a positive lens components arranged consecutively from the object side and designed as single-element components or cemented doublets respectively. The large relative aperture telephoto lens system according to the present invention has a lens composition described above and is designed for focusing by shifting the two negative lens components in said diverging lens group and said second converging lens group as a whole independently along the optical axis while changing the relative airspaces respectively so as to obtain stable satisfactory images of all objects located from infinite to short distances. Speaking more concretely, the large relative aperture telephoto lens system according to the present invention comprises two lens components each of which is designed as a cemented doublet or separated two lens elements to be shifted in the diverging lens group, the second converging lens group consisting of three positive, negative and positive lens components and the first converging lens group consisting of four lens components, and permits focusing by changing relative airspaces of said two lens components and said second converging lens group respectively.

In the lens system according to the present invention, each of the movable lens components is not designed as an single-element lens but as a cemented doublet or separated two elements, and said two lens components have different refractive indices and Abbe's numbers so as to minimize spherical aberration, astigmatism, coma and chromatic aberration produced when the movable lens components are shifted. Further, the lens system according to the present invention is capable of reducing curvature of field (Petzval's sum) for all objects located within a range from infinite to short distances. When only one of the two movable lens components in the diverging lens group is designed not as a single-element lens component but as a cemented doublet or two separated lens elements, it is obliged to sacrifice at least either stability or flatness of image plane in focusing, thereby making performance of the lens system insufficient as that of a high performance lens system. For this reason, each of the movable lens components in the diverging lens group is designed as a cemented doublet or separated into two lens elements respectively.

In order to further improve the image plane characteristic for an object located at infinite distance by minimizing Petzval's sum and astigmatism, the lens system according to the present invention divides the second converging lens group having positive refractive power into the two positive and negative lens components and selects a required sufficient difference in refractive index between these two lens components. Further, in order to simultaneously correct longitudinal chromatic aberration and lateral chromatic aberration which are produced by designing the second converging lens group as described above, the negative one of the two divided lens components is further divided into a negative lens element and a positive lens element. The second converging lens group consists of the positive lens component, negative lens component and positive lens component arranged in this order as described above, and selects required sufficient differences in Abbe's number among these lens components.

In case where the first converging lens group is composed of three lens components, two positive lens components and a negative lens component are generally used. In such a lens composition, however, it is required to use a glass material having a high partial dispersion ratio and a large Abbe's number for both the positive lens components in order to correct second-order spectrum in such a large relative aperture telephoto lens system as is provided by the present invention. However, such a glass material has a low refractive index, thereby increasing spherical aberration and Petzval's sum unavoidably. Therefore, in the lens system according to the present invention, another positive lens component is added in the first converging lens group to compose it of four lens components, and rather a high refractive index is selected for the added positive lens component so as to minimize spherical aberration and Petzval's sum and favorably correct chromatic aberration.

Finally, the reason to select the focusing system in which two lens components and a lens group are made movable and relative airspaces of the individual lens components and lens group are changed for focusing will be described.

When the internal focusing system is adopted, aberrations are varied in focusing. In order to maintain stable performance at all the focusing stages, it is necessary to limit variations at least of spherical aberration, astigmatism and chromatic aberration within possible narrowest ranges, and when spherical aberration is varied a little, to adjust astigmatism in a required sufficient quantity in correspondence to the variation of spherical aberration.

The internal focusing system in which only one or two lens components are shifted as in the prior examples is capable of correcting spherical aberration and chromatic aberration at most but not astigmatism sufficiently when the lens system is focused on an object located at a short distance. In case of the focusing system in which the diverging lens group is simply shifted toward the image side, spherical aberration is generally undercorrected though it may be overcorrected depending on selection of difference in refractive index between the cemented doublets or separated single-element lens components as well as incidence angle of the paraxial rays. Any way, the focusing system of this type can hardly minimize variations of aberrations to such degrees that they are sufficiently constant within a range from infinite to short distances.

For this reason, the lens system according to the present invention is designed so as to suppress variation mainly of spherical aberration while changing the relative airspace between the two lens components in the diverging lens group and prevent variation mainly of astigmatism while changing the relative airspace between the second converging lens group and diverging lens group.

By designing at least two lens components and a lens group so as to be movable and adopting the system for focusing by changing the airspaces of the lens components and lens group, the present invention has made it possible to provide a high performance lens system which assures little variations of aberrations within a range from infinite distance to short distance at which magnification is on the order of 1/10. The lens system according to the present invention practically permits photographing satisfactory image when focused on an object located at a distance shorter than the distance corresponding to a magnification of 1/10.

For focusing the lens system having the above-described composition on a shorter distance by shifting the two lens components in the diverging lens group and the second converging lens group independently, both the lens components are shifted toward the image side.

Though the large relative aperture telephoto lens system having the above-described composition has satisfactory performance accomplishing the object of the present invention, the performance is further improved by designing the lens system so as to satisfy the conditions specified below:

(1) $0.08 < n_5 - n_6$
(2) $10 < \nu_8 - \nu_7 < 45$ $$(3)\ 0.4f < \left(\frac{1}{f_5} + \frac{1}{f_6}\right)^{-1} < 0.55f$$

Wherein the reference symbols are defined as follows:
$n_5$ and $n_6$: refractive indices of the two lens elements of the cemented doublet arranged on the object side in the diverging lens group
$\nu_7$ and $\nu_8$: Abbe's numbers of the two lens elements of the cemented doublets arranged on the image side in the diverging lens group
$f_5$: focal length of the cemented doublet arranged on the object side in the diverging lens group
$f_6$: focal length of the cemented doublet arranged on the image side in the diverging lens group
$f$: focal length of the lens system as a whole Now, significance of the above-mentioned conditions (1) through (3) will be described below:

The condition (1) specifies difference in refractive index between the two elements (positive and negative) of the movable lens component arranged on the object side in the diverging lens group. When the difference in refractive index is larger than the lower limit of the condition (1), it is possible to minimize undercorrection of spherical aberration, swelling of zonal portion of spherical aberration toward the negative side and variations of astigmatism, etc. when the lens system is focused on an object located at a short distance. This effect is more remarkable than that available by selecting a large difference in refractive index between the two elements of the movable lens component arranged on the image side.

The condition (2) specifies difference in Abbe's number between the positive and negative elements of the movable lens component arranged on the image side in the diverging lens group. By selecting a large difference in Abbe's number between the two elements of the movable lens component arranged on the image side as specified by this condition, it is possible to minimize variation of lateral chromatic aberration produced when the movable lens component is shifted and lessen the tendency to overcorrect the marginal amount of g line of spherical aberration. If difference in Abbe's number deviates from the range defined by the condition (2), lateral chromatic aberration will vary remarkably and other undesirable effects will result in.

The condition (3) specifies powers of the two lens components of the diverging lens group. If the upper limit of this condition is exceeded, the individual types of aberrations will undesirably be produced. If the lower limit of the condition (3) is exceeded, shifting distance for focusing will undesirably be prolonged.

A lens system having more stable or desirable performance can be obtained by designing it so as to satisfy the following conditions (4) through (6) in addition to the above-mentioned conditions:

(4) $0.08 < n_7 - n_8$
(5) $0.1 < n_9 - n_{10}$
(6) $10 < \nu_{11} - \nu_{10}$ wherein the reference symbols are defined as follows:
$n_7$ and $n_8$: refractive indices of the two elements of the movable lens component arranged on the image side in the diverging lens group
$n_9$: refractive index of the positive lens component arranged on the object side in the second converging lens group
$n_{10}$: refractive index of the negative lens component arranged in the second converging lens group
$\nu_{10}$: Abbe's number of the negative lens component arranged in the second converging lens group
$\nu_{11}$: Abbe's number of the positive lens component arranged on the image side in the second converging lens group The above-mentioned condition (4) specifies difference in refractive index between the two elements of the movable lens component arranged on the image side of the diverging lens group. Since the two elements of the movable lens component arranged on the image side have powers larger than those of the two elements of the movable lens component arranged on the object side, the former lens elements are more effective to minimize Petzval's sum. If difference in refractive index deviates from the range specified by the condition (4), Petzval's sum is undesirably enlarged. Further, by selecting a large refractive index for the positive element and a small refractive index for the negative element of the movable lens component arranged on the image side as defined by the condition (4), variations of aberrations can be minimized when the lens system is focused on an object located at a short distance. However, only a lower effect can be obtained by composing the movable lens component arranged in the object side in the same manner.

The condition (5) defines refractive index of the second converging lens group for the purpose of favorably correcting Petzval's sum and astigmatism. If refractive index of the second converging lens group deviates from the range specified by the condition (5), Petzval's sum will be inadequate and astigmatism will not be corrected favorably. Moreover, astigmatism will be corrected more favorably by selecting a larger difference $n_{11} - n_{10}$ between the negative element and positive element of the cemented doublet arranged in the second converging lens group in addition to the condition (5).

The condition (6) defines Abbe's number of the second converging lens group for the purpose of facilitating to balance longitudinal chromatic aberration with lateral chromatic aberration at infinite distance. If $\nu_{11} - \nu_{10}$ deviates from the range specified by the condition (6), longitudinal chromatic aberration will not be balance adequately with lateral chromatic aberration. In addition, it will be more effective for adequate balance between both the chromatic aberrations to select a larger difference $\nu_9 - \nu_{10}$ between Abbe's numbers of the positive lens component arranged on the object side and negative lens component in the second converging lens group.

DETAILED DESCRIPTION OF THE PREFERRED EMBODIMENTS

Figure 1:
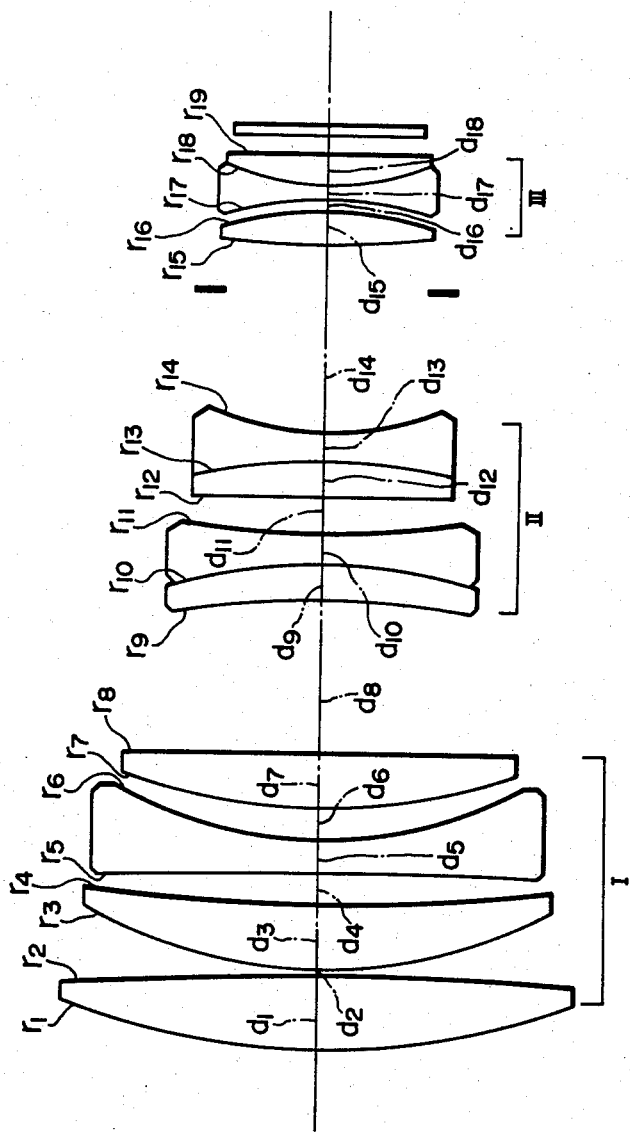
FIG. 1 shows a sectional view illustrating the composition of the lens system according to the present invention.

Now, numerical data will be described as preferred embodiments of the present invention:

Embodiment 1

$r_1 = 84.4449$
  $d_1 = 5.7732$   $n_1 = 1.60311$   $\nu_1 = 60.70$
$r_2 = -274.9210$
  $d_2 = 0.2058$
$r_3 = 46.2913$
  $d_3 = 8.2474$   $n_2 = 1.49700$   $\nu_2 = 81.61$
$r_4 = 318.5034$
  $d_4 = 2.8866$
$r_5 = -735.4117$
  $d_5 = 3.2990$   $n_3 = 1.64769$   $\nu_3 = 33.80$
$r_6 = 43.7536$
  $d_6 = 1.2367$
$r_7 = 52.4491$
  $d_7 = 6.1856$   $n_4 = 1.49700$   $\nu_4 = 81.61$
$r_8 = 584.2215$
  $d_8 = D_1$
$r_9 = -78.4683$
  $d_9 = 2.8866$   $n_5 = 1.78590$   $\nu_5 = 44.18$
$r_{10} = -41.7171$
  $d_{10} = 2.8866$   $n_6 = 1.51823$   $\nu_6 = 58.96$
$r_{11} = 51.8208$
  $d_{11} = D_2$
$r_{12} = 433.9990$
  $d_{12} = 3.2990$   $n_7 = 1.74950$   $\nu_7 = 35.27$
$r_{13} = -55.2372$
  $d_{13} = 2.4742$   $n_8 = 1.51633$   $\nu_8 = 64.15$
$r_{14} = 33.7825$
  $d_{14} = D_3$
$r_{15} = 56.4859$
  $d_{15} = 3.2990$   $n_9 = 1.77250$   $\nu_9 = 49.66$
$r_{16} = -47.7808$
  $d_{16} = 1.2538$
$r_{17} = -42.3250$
  $d_{17} = 1.2371$   $n_{10} = 1.60342$   $\nu_{10} = 38.01$
$r_{18} = 29.2522$
  $d_{18} = 2.8866$   $n_{11} = 1.58913$   $\nu_{11} = 60.97$
$r_{19} = -127.8522$
  $f = 100, 2\omega = 10.2°, f_5 = -72.9$ $$f_6 = -109.3, \left(\frac{1}{f_5} + \frac{1}{f_6}\right)^{-1} = 43.73$$

| Object Point | $D_1$ | $D_2$ | $D_3$ | f |
|---|---|---|---|---|
| ∞ | 14.4594 | 4.9616 | 14.8416 | 100 |
| 3.05 m | 15.8887 | 5.7852 | 11.7612 | 100.1402 |
| 0.99 m | 19.8499 | 7.0214 | 5.7373 | 98.7274 |

Embodiment 2

$r_1 = 83.1647$
  $d_1 = 6.8041$   $n_1 = 1.60311$   $\nu_1 = 60.70$
$r_2 = -279.9293$
  $d_2 = 0.2058$
$r_3 = 47.5582$
  $d_3 = 7.4227$   $n_2 = 1.49700$   $\nu_2 = 81.61$
$r_4 = 172.7366$
  $d_4 = 2.8866$
$r_5 = -543.0752$
  $d_5 = 3.2990$   $n_3 = 1.64769$   $\nu_3 = 33.80$
$r_6 = 47.8211$
  $d_6 = 2.4743$
$r_7 = 58.4210$
  $d_7 = 5.3608$   $n_4 = 1.49700$   $\nu_4 = 81.61$
$r_8 = -415.0663$
  $d_8 = D_1$
$r_9 = -80.3192$
  $d_9 = 3.5876$   $n_5 = 1.74950$   $\nu_5 = 35.27$
$r_{10} = -42.4378$
  $d_{10} = 2.8866$   $n_6 = 1.51633$   $\nu_6 = 64.15$
$r_{11} = 53.9175$
  $d_{11} = D_2$
$r_{12} = 580.1772$
  $d_{12} = 3.5052$   $n_7 = 1.78590$   $\nu_7 = 44.18$
$r_{13} = -53.8577$
  $d_{13} = 2.4742$   $n_8 = 1.51823$   $\nu_8 = 58.96$
$r_{14} = 34.0644$
  $d_{14} = D_3$
$r_{15} = 54.0398$
  $d_{15} = 3.2990$   $n_9 = 1.77250$   $\nu_9 = 49.66$
$r_{16} = -44.9532$
  $d_{16} = 1.2538$
$r_{17} = -39.7583$
  $d_{17} = 1.2371$   $n_{10} = 1.60342$   $\nu_{10} = 38.01$
$r_{18} = 32.3847$
  $d_{18} = 2.8866$   $n_{11} = 1.58913$   $\nu_{11} = 60.97$
$r_{19} = -187.5967$
  $f = 100, 2\omega = 10.2°, f_5 = -73.7$ $$f_6 = -114.9, \left(\frac{1}{f_5} + \frac{1}{f_6}\right)^{-1} = 44.90$$

| Object Point | $D_1$ | $D_2$ | $D_3$ | f |
|---|---|---|---|---|
| ∞ | 16.1901 | 3.5167 | 15.4577 | 100 |
| 3.05 m | 17.6499 | 4.3414 | 12.3489 | 100.0148 |
| 0.99 m | 21.4322 | 6.8157 | 5.2680 | 98.5827 |

Embodiment 3

$r_1 = 69.3417$
  $d_1 = 7.4227$   $n_1 = 1.60311$   $\nu_1 = 60.70$
$r_2 = -291.6597$
  $d_2 = 0.2021$
$r_3 = 46.8848$
  $d_3 = 6.8041$   $n_2 = 1.49700$   $\nu_2 = 81.61$
$r_4 = 190.0616$
  $d_4 = 2.8866$
$r_5 = -498.7464$
  $d_5 = 3.2990$   $n_3 = 1.64769$   $\nu_3 = 33.80$
$r_6 = 43.0165$
  $d_6 = 2.4739$
$r_7 = 55.7931$
  $d_7 = 5.3608$   $n_4 = 1.49700$   $\nu_4 = 81.61$

-continued

| | | | |
|---|---|---|---|
| $r_8 = -2099.8307$ | | | |
| | $d_8 = D_1$ | | |
| $r_9 = -87.5570$ | | | |
| | $d_9 = 3.5876$ | $n_5 = 1.80440$ | $\nu_5 = 39.58$ |
| $r_{10} = -44.4242$ | | | |
| | $d_{10} = 2.8866$ | $n_6 = 1.51633$ | $\nu_6 = 64.15$ |
| $r_{11} = 60.3373$ | | | |
| | $d_{11} = D_2$ | | |
| $r_{12} = 2187.0425$ | | | |
| | $d_{12} = 3.5052$ | $n_7 = 1.74950$ | $\nu_7 = 35.27$ |
| $r_{13} = -51.3497$ | | | |
| | $d_{13} = 2.4742$ | $n_8 = 1.51454$ | $\nu_8 = 54.69$ |
| $r_{14} = 31.5584$ | | | |
| | $d_{14} = D_3$ | | |
| $r_{15} = 50.3768$ | | | |
| | $d_{15} = 3.2990$ | $n_9 = 1.77250$ | $\nu_9 = 49.66$ |
| $r_{16} = -52.4982$ | | | |
| | $d_{16} = 1.2545$ | | |
| $r_{17} = -45.4461$ | | | |
| | $d_{17} = 1.2371$ | $n_{10} = 1.60342$ | $\nu_{10} = 38.01$ |
| $r_{18} = 29.4799$ | | | |
| | $d_{18} = 2.8866$ | $n_{11} = 1.58913$ | $\nu_{11} = 60.97$ |
| $r_{19} = -183.9024$ | | | |

$f = 100, 2\omega = 10.2°, f_5 = -88.2$ $$f_6 = -88.9, \left(\frac{1}{f_5} + \frac{1}{f_6}\right)^{-1} = 44.27$$

| Object Point | $D_1$ | $D_2$ | $D_3$ | f |
|---|---|---|---|---|
| ∞ | 14.7204 | 3.8581 | 16.4049 | 100 |
| 3.05 m | 16.1043 | 4.6829 | 13.3720 | 100.0338 |
| 0.99 m | 19.7658 | 5.9200 | 7.2363 | 98.2672 |

Embodiment 4

| | | | |
|---|---|---|---|
| $r_1 = 67.6668$ | | | |
| | $d_1 = 7.8350$ | $n_1 = 1.60311$ | $\nu_1 = 60.70$ |
| $r_2 = -249.6781$ | | | |
| | $d_2 = 0.2019$ | | |
| $r_3 = 46.1550$ | | | |
| | $d_3 = 6.3918$ | $n_2 = 1.49700$ | $\nu_2 = 81.61$ |
| $r_4 = 201.1326$ | | | |
| | $d_4 = 3.0928$ | | |
| $r_5 = -397.5636$ | | | |
| | $d_5 = 3.0928$ | $n_3 = 1.64769$ | $\nu_3 = 33.80$ |
| $r_6 = 42.9978$ | | | |
| | $d_6 = 2.8864$ | | |
| $r_7 = 66.2145$ | | | |
| | $d_7 = 4.9485$ | $n_4 = 1.49700$ | $\nu_4 = 81.61$ |
| $r_8 = 3864.6596$ | | | |
| | $d_8 = D_1$ | | |
| $r_9 = -109.1493$ | | | |
| | $d_9 = 3.5876$ | $n_5 = 1.70154$ | $\nu_5 = 41.21$ |
| $r_{10} = -46.5350$ | | | |
| | $d_{10} = 2.8866$ | $n_6 = 1.49831$ | $\nu_6 = 65.03$ |
| $r_{11} = 111.3747$ | | | |
| | $d_{11} = D_2$ | | |
| $r_{12} = 437.1910$ | | | |
| | $d_{12} = 3.5052$ | $n_7 = 1.58144$ | $\nu_7 = 40.75$ |
| $r_{13} = -56.9916$ | | | |
| | $d_{13} = 2.4742$ | $n_8 = 1.49831$ | $\nu_8 = 65.03$ |
| $r_{14} = 30.3915$ | | | |
| | $d_{14} = D_3$ | | |
| $r_{15} = 98.7285$ | | | |
| | $d_{15} = 3.0928$ | $n_9 = 1.77250$ | $\nu_9 = 49.66$ |
| $r_{16} = -36.9204$ | | | |
| | $d_{16} = 1.2368$ | | |
| $r_{17} = -34.1713$ | | | |
| | $d_{17} = 1.2371$ | $n_{10} = 1.60342$ | $\nu_{10} = 38.01$ |
| $r_{18} = 27.4803$ | | | |
| | $d_{18} = 3.0928$ | $n_{11} = 1.73400$ | $\nu_{11} = 51.49$ |
| $r_{19} = -239.0432$ | | | |

$f = 100, 2\omega = 10.2°, f_5 = -152.6$ $$f_6 = -74.1, \left(\frac{1}{f_5} + \frac{1}{f_6}\right)^{-1} = 49.88$$

-continued

| Object Point | $D_1$ | $D_2$ | $D_3$ | f |
|---|---|---|---|---|
| ∞ | 14.2136 | 3.3715 | 17.8557 | 100 |
| 3.05 m | 15.7089 | 4.1971 | 14.7113 | 99.9831 |
| 1.03 m | 20.3641 | 4.1971 | 9.2309 | 98.4309 |

Embodiment 5

| | | | |
|---|---|---|---|
| $r_1 = 71.1487$ | | | |
| | $d_1 = 7.4227$ | $n_1 = 1.60311$ | $\nu_1 = 60.70$ |
| $r_2 = -304.2733$ | | | |
| | $d_2 = 0.2021$ | | |
| $r_3 = 45.9101$ | | | |
| | $d_3 = 6.7216$ | $n_2 = 1.49700$ | $\nu_2 = 81.61$ |
| $r_4 = 232.0865$ | | | |
| | $d_4 = 3.0928$ | | |
| $r_5 = -777.1552$ | | | |
| | $d_5 = 3.0928$ | $n_3 = 1.63980$ | $\nu_3 = 34.48$ |
| $r_6 = 39.8462$ | | | |
| | $d_6 = 2.8863$ | | |
| $r_7 = 52.5987$ | | | |
| | $d_7 = 5.0309$ | $n_4 = 1.49700$ | $\nu_4 = 81.61$ |
| $r_8 = 573.8540$ | | | |
| | $d_8 = D_1$ | | |
| $r_9 = -100.2201$ | | | |
| | $d_9 = 3.5876$ | $n_5 = 1.73400$ | $\nu_5 = 51.49$ |
| $r_{10} = -51.9273$ | | | |
| | $d_{10} = 2.8866$ | $n_6 = 1.46450$ | $\nu_6 = 65.94$ |
| $r_{11} = 75.8864$ | | | |
| | $d_{11} = D_2$ | | |
| $r_{12} = 670.3402$ | | | |
| | $d_{12} = 3.5052$ | $n_7 = 1.68893$ | $\nu_7 = 31.08$ |
| $r_{13} = -71.3273$ | | | |
| | $d_{13} = 2.4742$ | $n_8 = 1.49831$ | $\nu_8 = 65.03$ |
| $r_{14} = 30.9974$ | | | |
| | $d_{14} = D_3$ | | |
| $r_{15} = 76.0739$ | | | |
| | $d_{15} = 3.0928$ | $n_9 = 1.77250$ | $\nu_9 = 49.66$ |
| $r_{16} = -39.7415$ | | | |
| | $d_{16} = 1.2372$ | | |
| $r_{17} = -36.8061$ | | | |
| | $d_{17} = 1.2371$ | $n_{10} = 1.60342$ | $\nu_{10} = 38.01$ |
| $r_{18} = 28.3367$ | | | |
| | $d_{18} = 3.0928$ | $n_{11} = 1.67790$ | $\nu_{11} = 55.33$ |
| $r_{19} = -232.1710$ | | | |

$f = 100, 2\omega = 10.2°, f_5 = -120.6$ $$f_6 = -81.6, \left(\frac{1}{f_5} + \frac{1}{f_6}\right)^{-1} = 48.67$$

| Object Point | $D_1$ | $D_2$ | $D_3$ | f |
|---|---|---|---|---|
| ∞ | 14.2165 | 3.3732 | 18.1452 | 100 |
| 3.05 m | 15.9715 | 3.7856 | 15.3584 | 99.9926 |
| 1.03 m | 20.1703 | 4.6103 | 9.7171 | 98.6202 |

Embodiment 6

| | | | |
|---|---|---|---|
| $r_1 = 72.7504$ | | | |
| | $d_1 = 7.6289$ | $n_1 = 1.60311$ | $\nu_1 = 60.70$ |
| $r_2 = -245.9035$ | | | |
| | $d_2 = 0.2019$ | | |
| $r_3 = 47.2477$ | | | |
| | $d_3 = 6.3918$ | $n_2 = 1.49700$ | $\nu_2 = 81.61$ |
| $r_4 = 189.6996$ | | | |
| | $d_4 = 3.0928$ | | |
| $r_5 = -370.9012$ | | | |
| | $d_5 = 3.0928$ | $n_3 = 1.64769$ | $\nu_3 = 33.80$ |
| $r_6 = 46.0426$ | | | |
| | $d_6 = 2.8865$ | | |
| $r_7 = 61.6026$ | | | |
| | $d_7 = 5.1546$ | $n_4 = 1.49700$ | $\nu_4 = 81.61$ |
| $r_8 = -657.3048$ | | | |
| | $d_8 = D_1$ | | |
| $r_9 = -100.7518$ | | | |
| | $d_9 = 3.5876$ | $n_5 = 1.58144$ | $\nu_5 = 40.75$ |

-continued

| | | | | |
|---|---|---|---|---|
| $r_{10} =$ | $-38.1598$ | | | |
| | $d_{10} = 2.8866$ | $n_6 = 1.49831$ | $\nu_6 = 65.03$ | |
| $r_{11} =$ | $64.6174$ | | | |
| | $d_{11} = D_2$ | | | |
| $r_{12} =$ | $496.3340$ | | | |
| | $d_{12} = 3.5052$ | $n_7 = 1.77250$ | $\nu_7 = 49.66$ | |
| $r_{13} =$ | $-47.8045$ | | | |
| | $d_{13} = 2.4742$ | $n_8 = 1.49831$ | $\nu_8 = 65.03$ | |
| $r_{14} =$ | $31.0905$ | | | |
| | $d_{14} = D_3$ | | | |
| $r_{15} =$ | $68.4992$ | | | |
| | $d_{15} = 3.2990$ | $n_9 = 1.77250$ | $\nu_9 = 49.66$ | |
| $r_{16} =$ | $-58.7903$ | | | |
| | $d_{16} = 1.2368$ | | | |
| $r_{17} =$ | $-55.9273$ | | | |
| | $d_{17} = 1.2371$ | $n_{10} = 1.60342$ | $\nu_{10} = 38.01$ | |
| $r_{18} =$ | $29.0038$ | | | |
| | $d_{18} = 2.8866$ | $n_{11} = 1.69680$ | $\nu_{11} = 55.52$ | |
| $r_{19} =$ | $-708.7012$ | | | |
| | $f = 100, 2\omega = 10.2°, f_5 = -87.5$ | | | |

$$f_6 = -117.5, \left(\frac{1}{f_5} + \frac{1}{f_6}\right)^{-1} = 50.15$$

| Object Point | $D_1$ | $D_2$ | $D_3$ | $f$ |
|---|---|---|---|---|
| ∞ | 14.2136 | 3.3715 | 18.4734 | 100 |
| 3.05 m | 15.2907 | 4.1963 | 15.0454 | 99.2804 |
| 0.99 m | 20.2491 | 3.3715 | 10.5827 | 97.4664 |

Embodiment 7

| | | | | |
|---|---|---|---|---|
| $r_1 =$ | $64.7809$ | | | |
| | $d_1 = 7.4227$ | $n_1 = 1.60311$ | $\nu_1 = 60.70$ | |
| $r_2 =$ | $-294.1265$ | | | |
| | $d_2 = 0.2018$ | | | |
| $r_3 =$ | $46.7129$ | | | |
| | $d_3 = 6.8041$ | $n_2 = 1.49700$ | $\nu_2 = 81.61$ | |
| $r_4 =$ | $165.2799$ | | | |
| | $d_4 = 2.8866$ | | | |
| $r_5 =$ | $-430.2552$ | | | |
| | $d_5 = 3.2990$ | $n_3 = 1.64769$ | $\nu_3 = 33.80$ | |
| $r_6 =$ | $41.6846$ | | | |
| | $d_6 = 2.4741$ | | | |
| $r_7 =$ | $57.1426$ | | | |
| | $d_7 = 5.3608$ | $n_4 = 1.49700$ | $\nu_4 = 81.61$ | |
| $r_8 =$ | $-1693.4893$ | | | |
| | $d_8 = D_1$ | | | |
| $r_9 =$ | $-92.0511$ | | | |
| | $d_9 = 3.5876$ | $n_5 = 1.80440$ | $\nu_5 = 39.58$ | |
| $r_{10} =$ | $-46.4336$ | | | |
| | $d_{10} = 2.8866$ | $n_6 = 1.51633$ | $\nu_6 = 64.15$ | |
| $r_{11} =$ | $70.1068$ | | | |
| | $d_{11} = D_2$ | | | |
| $r_{12} =$ | $587.6749$ | | | |
| | $d_{12} = 3.5052$ | $n_7 = 1.74950$ | $\nu_7 = 35.27$ | |
| $r_{13} =$ | $-51.8366$ | | | |
| | $d_{13} = 2.4742$ | $n_8 = 1.51454$ | $\nu_8 = 54.69$ | |
| $r_{14} =$ | $29.6134$ | | | |
| | $d_{14} = D_3$ | | | |
| $r_{15} =$ | $48.4709$ | | | |
| | $d_{15} = 3.2990$ | $n_9 = 1.77250$ | $\nu_9 = 49.66$ | |
| $r_{16} =$ | $-56.7397$ | | | |
| | $d_{16} = 1.2367$ | | | |
| $r_{17} =$ | $-51.4269$ | | | |
| | $d_{17} = 1.2371$ | $n_{10} = 1.60342$ | $\nu_{10} = 38.01$ | |
| $r_{18} =$ | $27.7018$ | | | |
| | $d_{18} = 2.8866$ | $n_{11} = 1.58913$ | $\nu_{11} = 60.97$ | |
| $r_{19} =$ | $-366.8054$ | | | |
| | $f = 100, 2\omega = 10.2°, f_5 = -100.5$ | | | |

$$f_6 = -88.0, \left(\frac{1}{f_5} + \frac{1}{f_6}\right)^{-1} = 46.92$$

| Object Point | $D_1$ | $D_2$ | $D_3$ | $f$ |
|---|---|---|---|---|
| ∞ | 14.2425 | 3.3530 | 17.7216 | 100 |
| 3.05 m | 15.4313 | 4.1777 | 14.4709 | 99.7843 |
| 0.99 m | 20.2231 | 3.3530 | 9.6792 | 97.9641 |

Wherein the reference symbols $r_1$ through $r_{19}$ represent radii of curvature of the respective lens surfaces, the reference symbols $d_1$ through $d_{18}$ designate thicknesses of the respective lens elements and airspaces reserved therebetween, the reference symbols $n_1$ through $n_{11}$ denote refractive indices of the respective lens elements and the reference symbols $\nu_1$ through $\nu_{11}$ represent Abbe's numbers of the respective lens elements.

Figure 2:
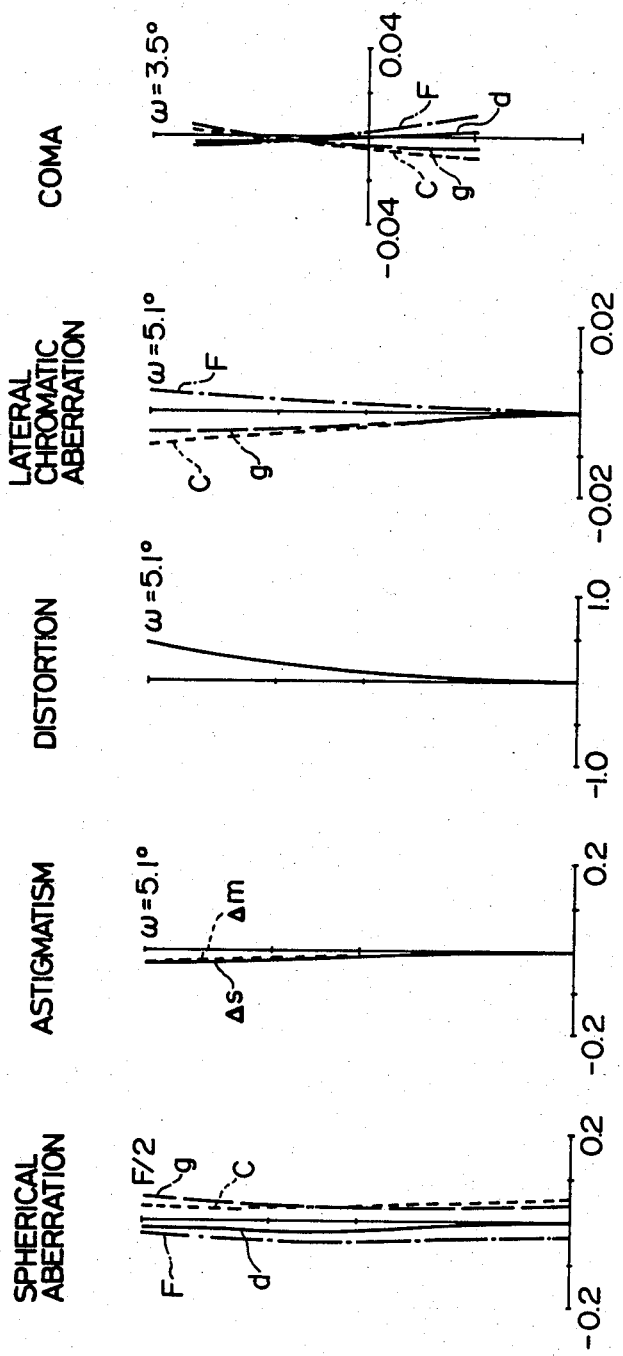
FIG. 2 through FIG. 4 show curves illustrating the aberration characteristics of an embodiment of the present invention.
Figure 3:
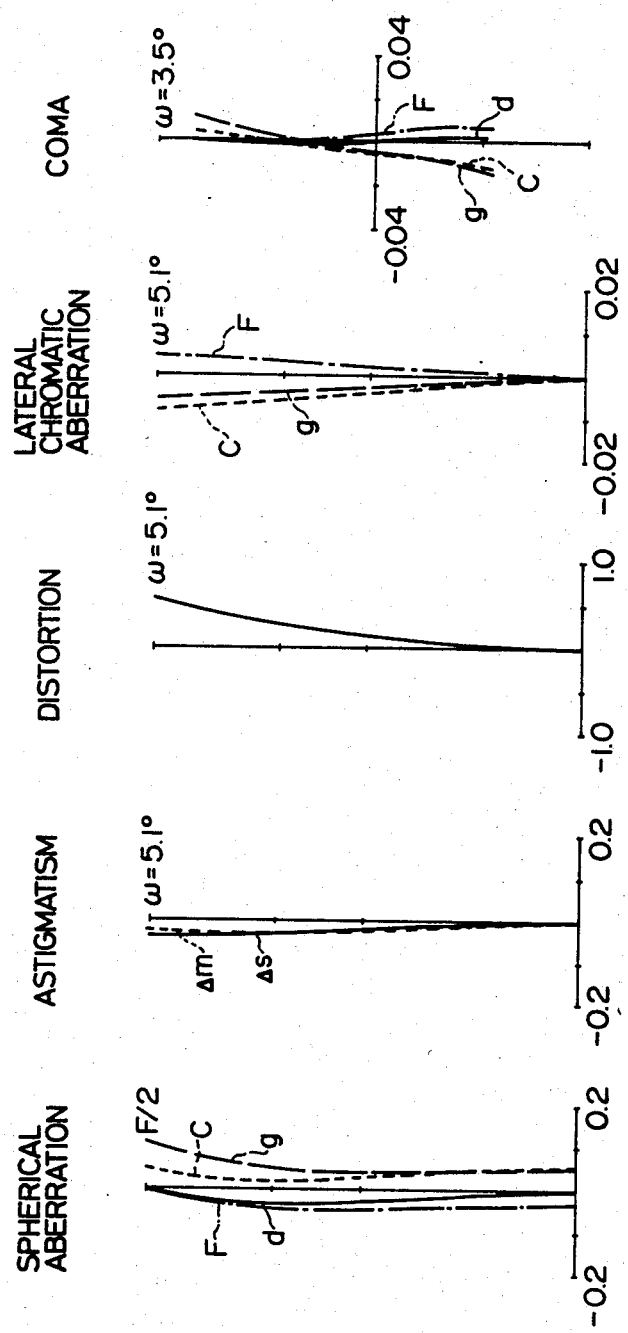
Figure 4:
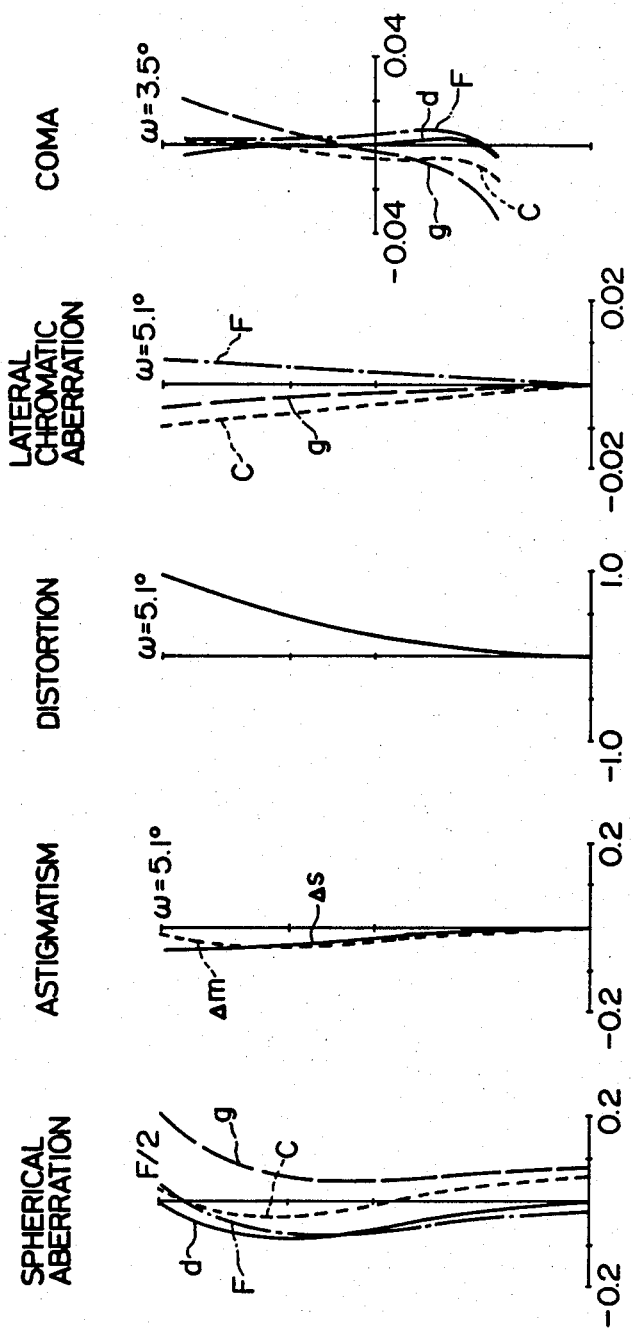
Figure 5:
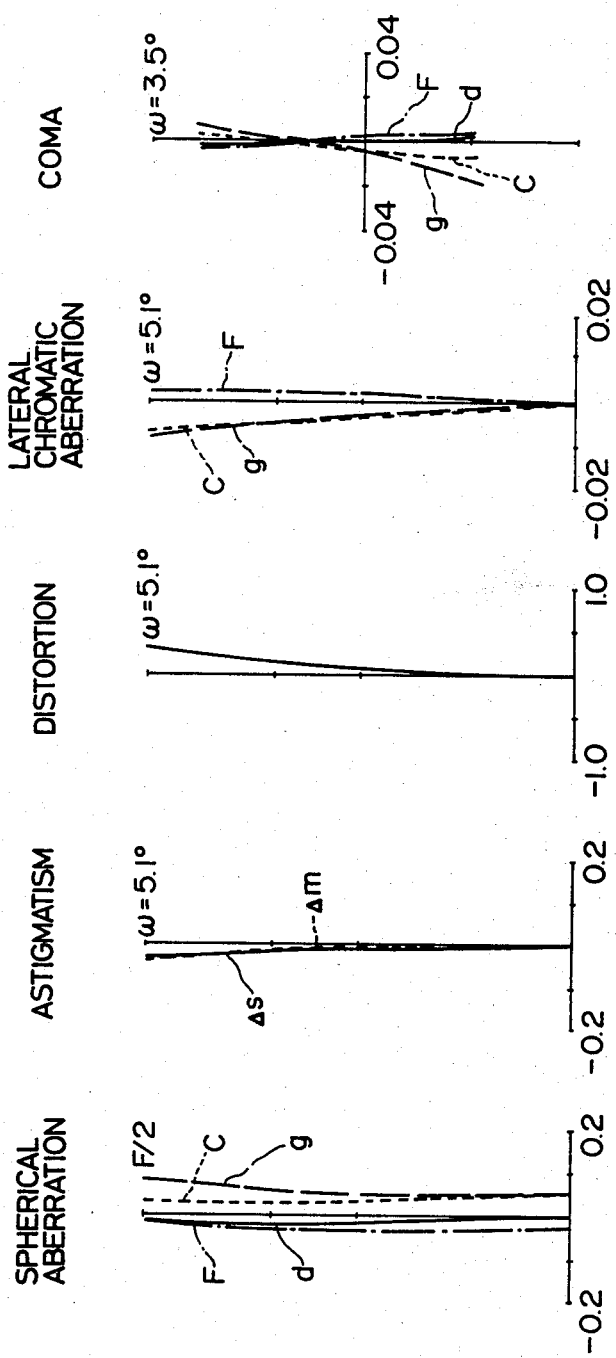
FIG. 5 through FIG. 7 show curves illustrating the aberration characteristics of another embodiment of the present invention.
Figure 6:
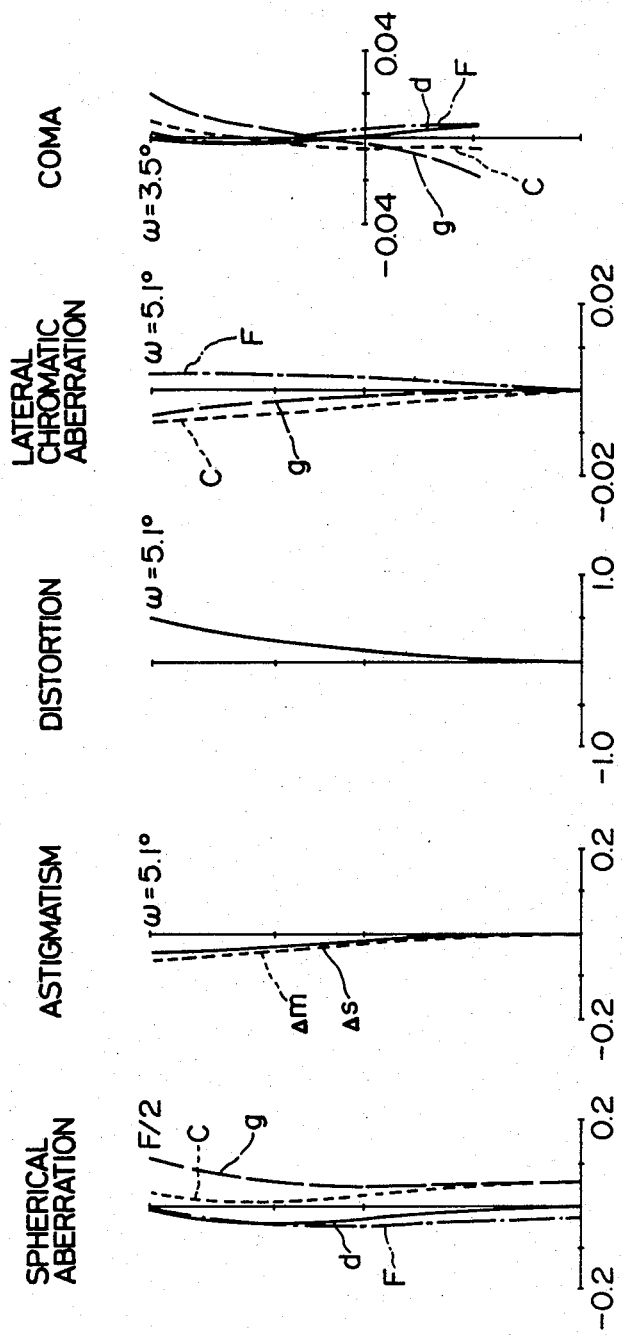
Figure 7:
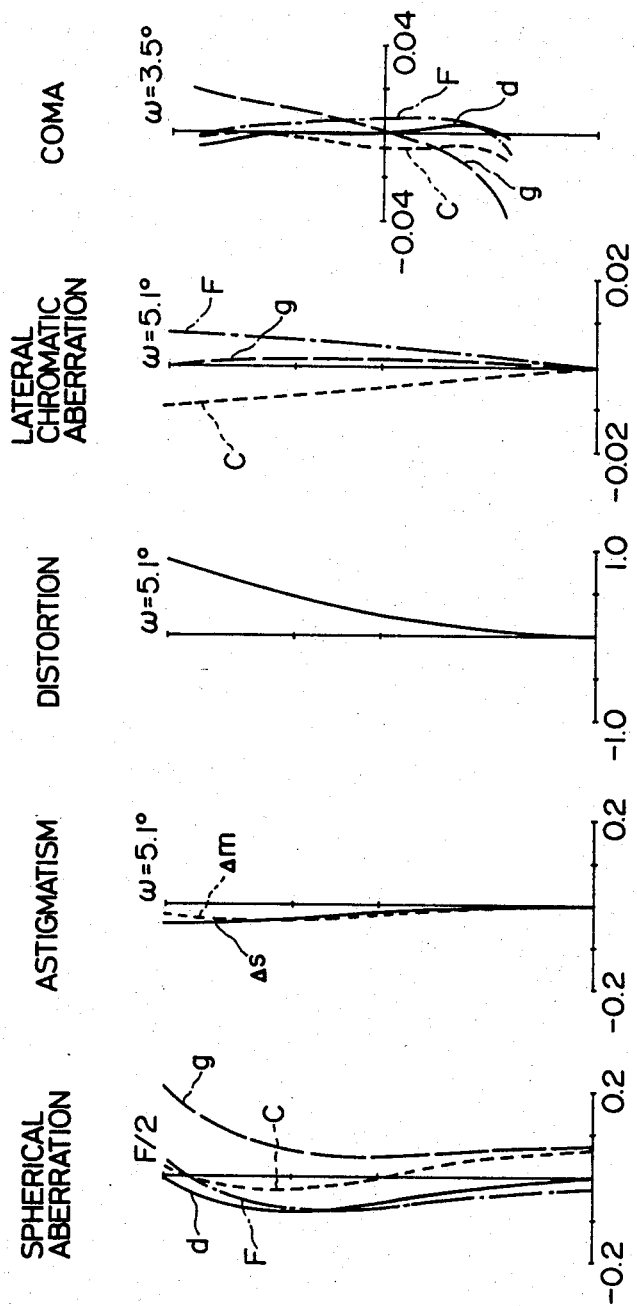
Figure 8:
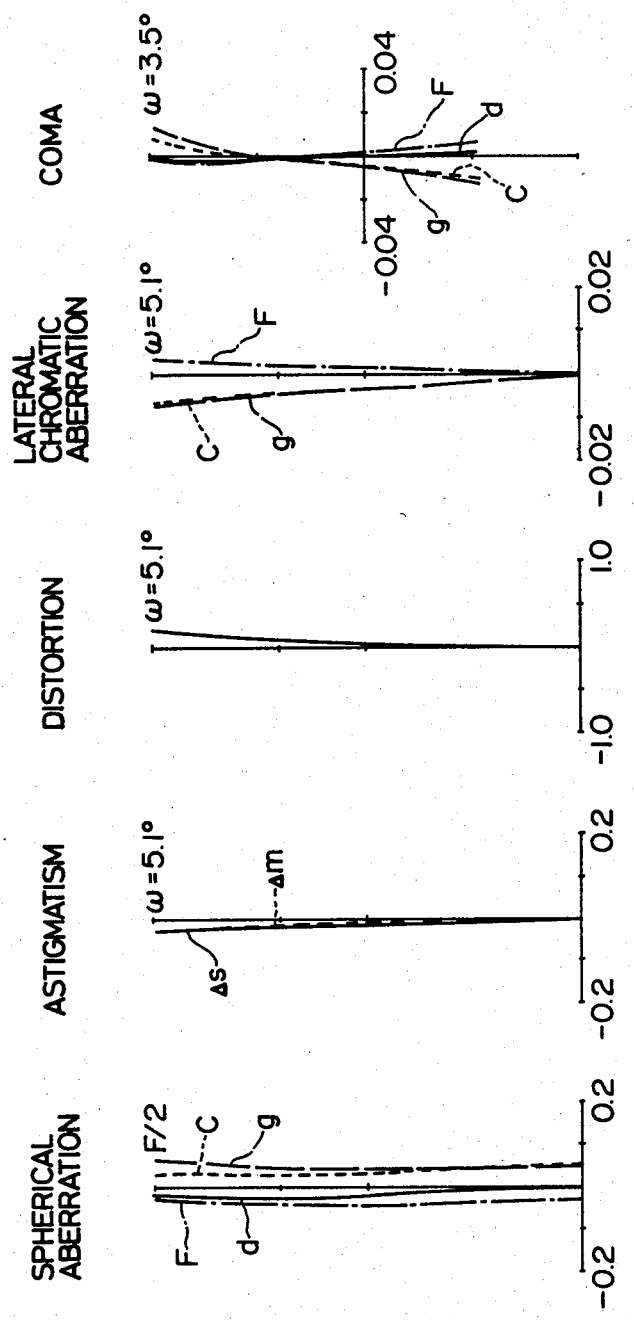
FIG. 8 through FIG. 10 show curves illustrating the aberration characteristics of a third embodiment of the present invention.
Figure 9:
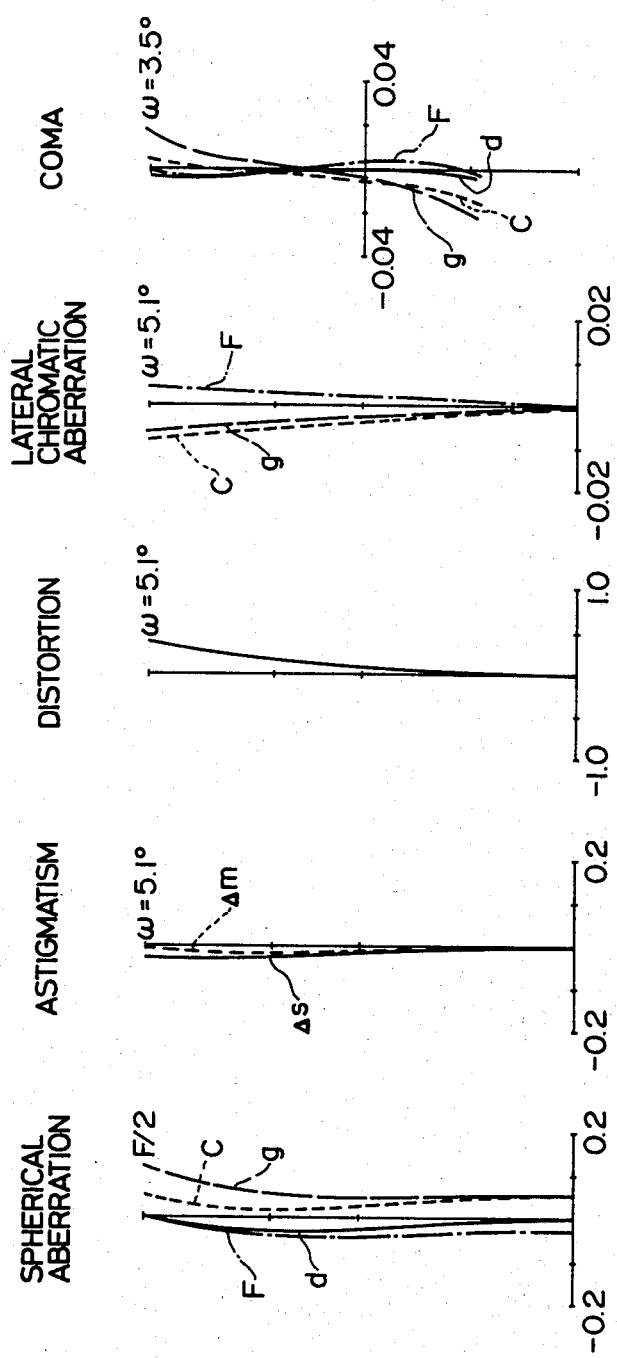
Figure 10:
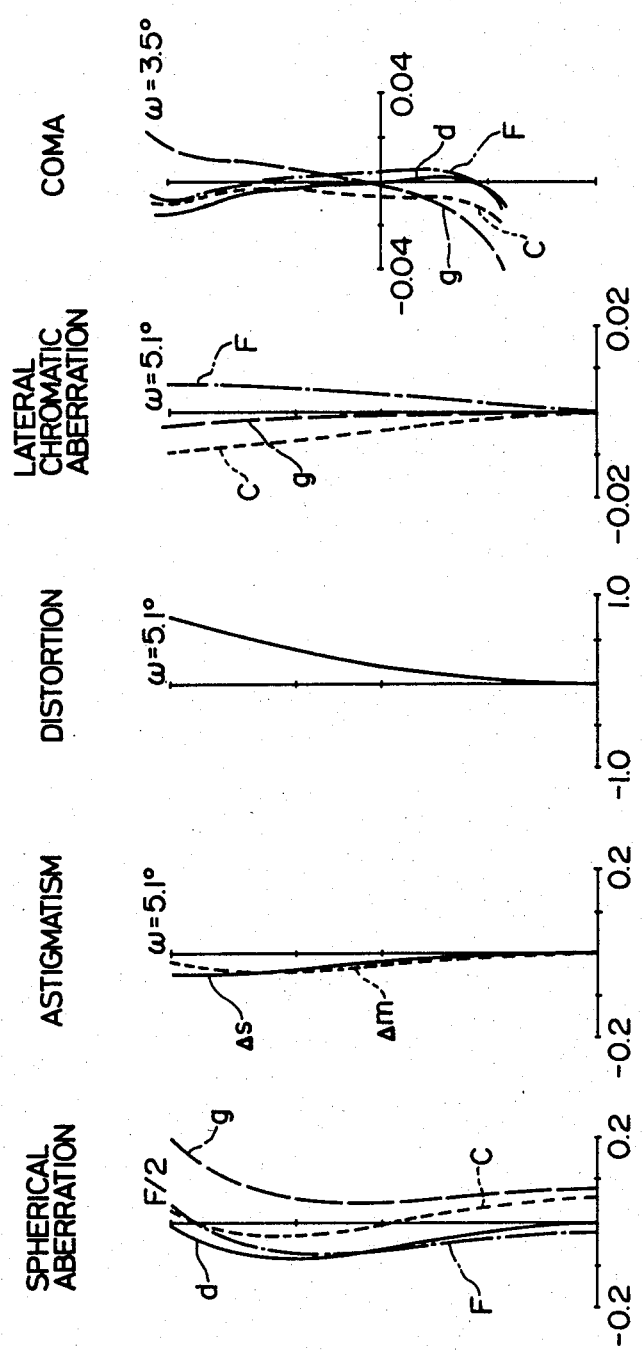
Figure 11:
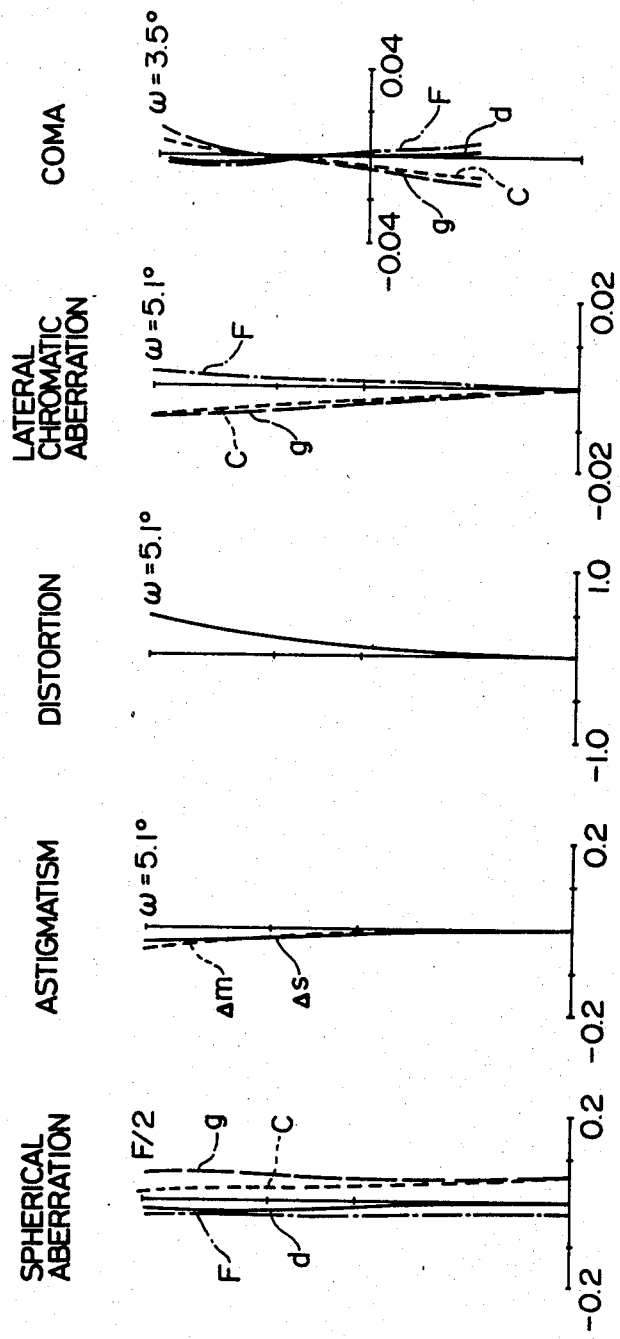
FIG. 11 through FIG. 13 show curves illustrating the aberration characteristics of a fourth embodiment of the present invention.
Figure 12:
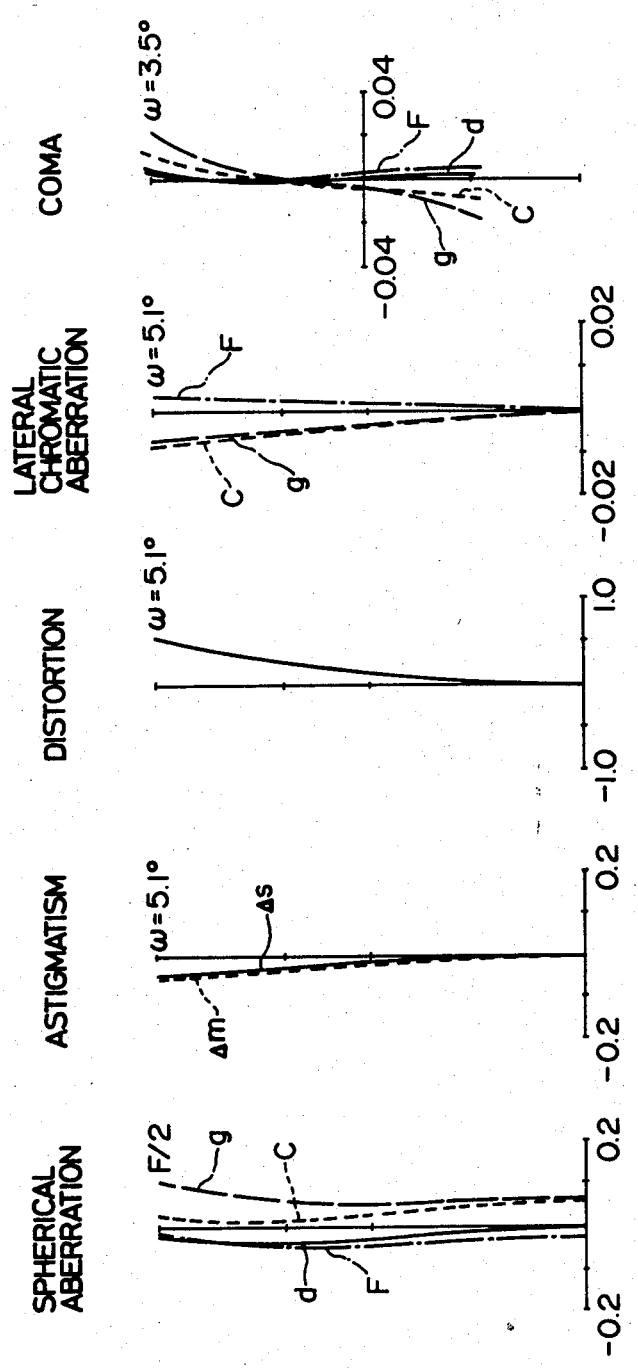
Figure 13:
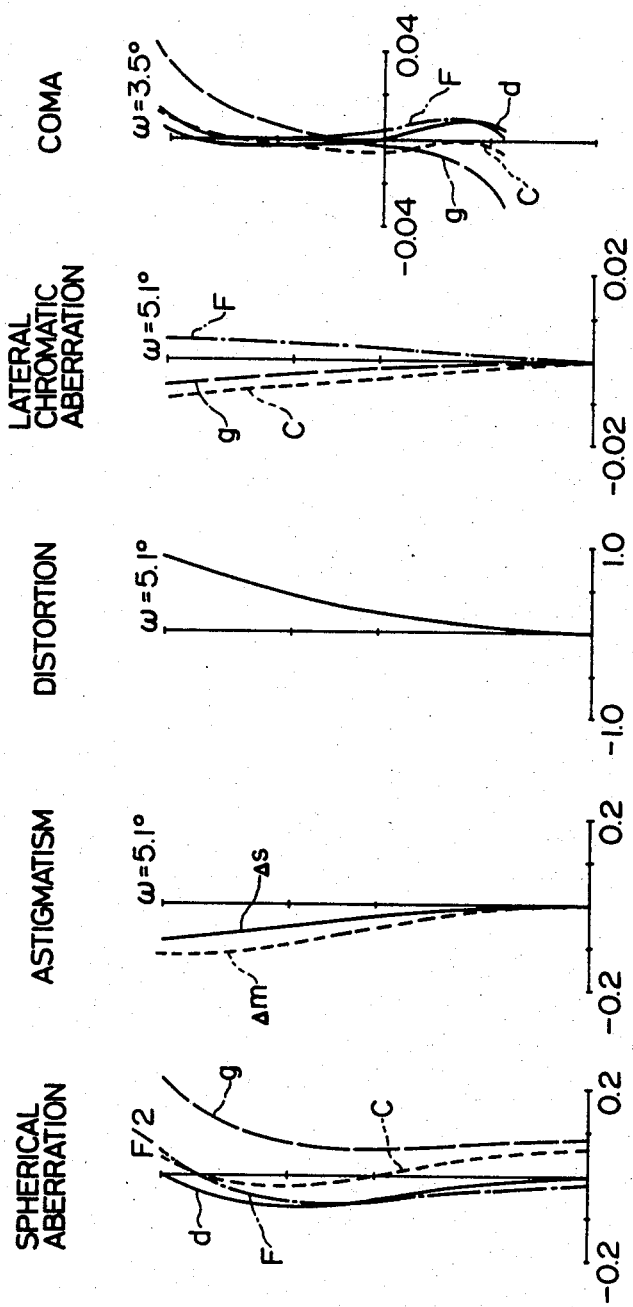
Figure 14:
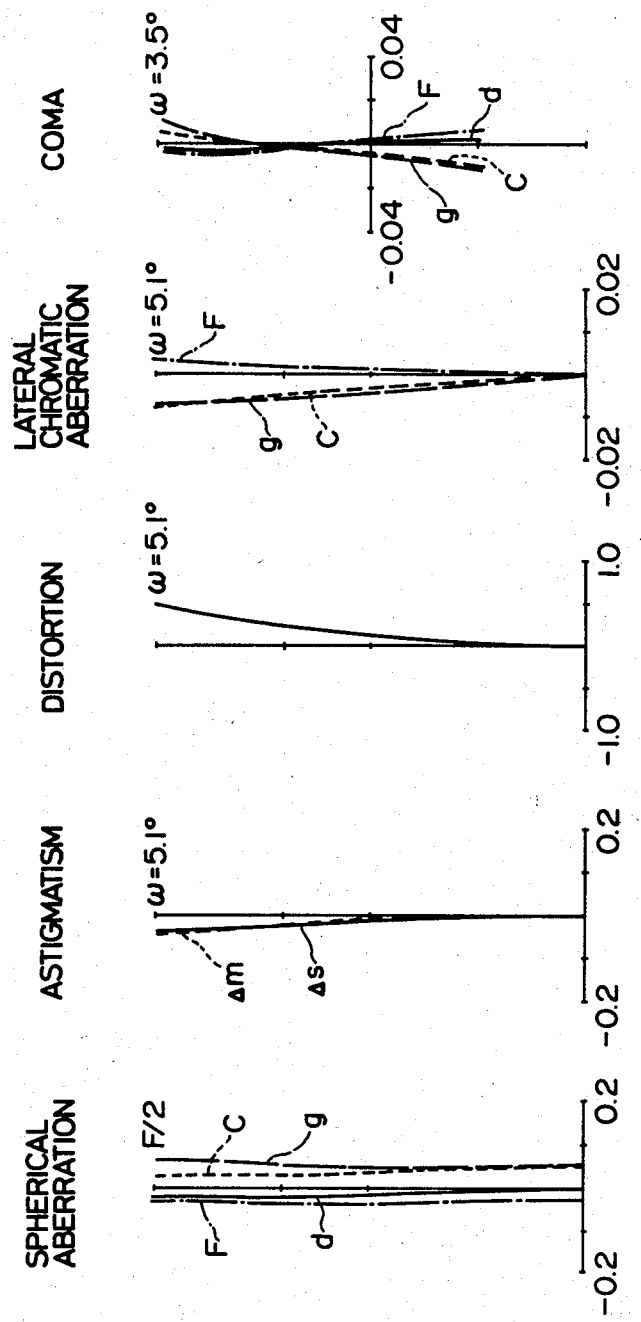
FIG. 14 through FIG. 16 show curves illustrating the aberration characteristics of a fifth embodiment of the present invention.
Figure 15:
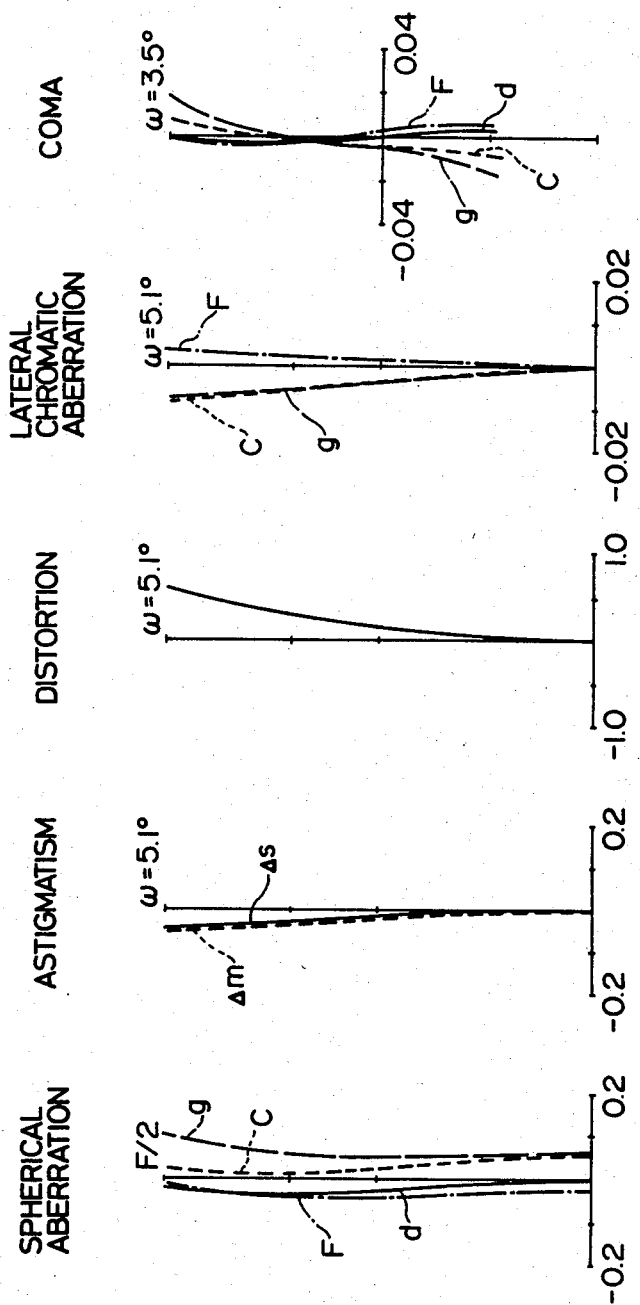
Figure 16:
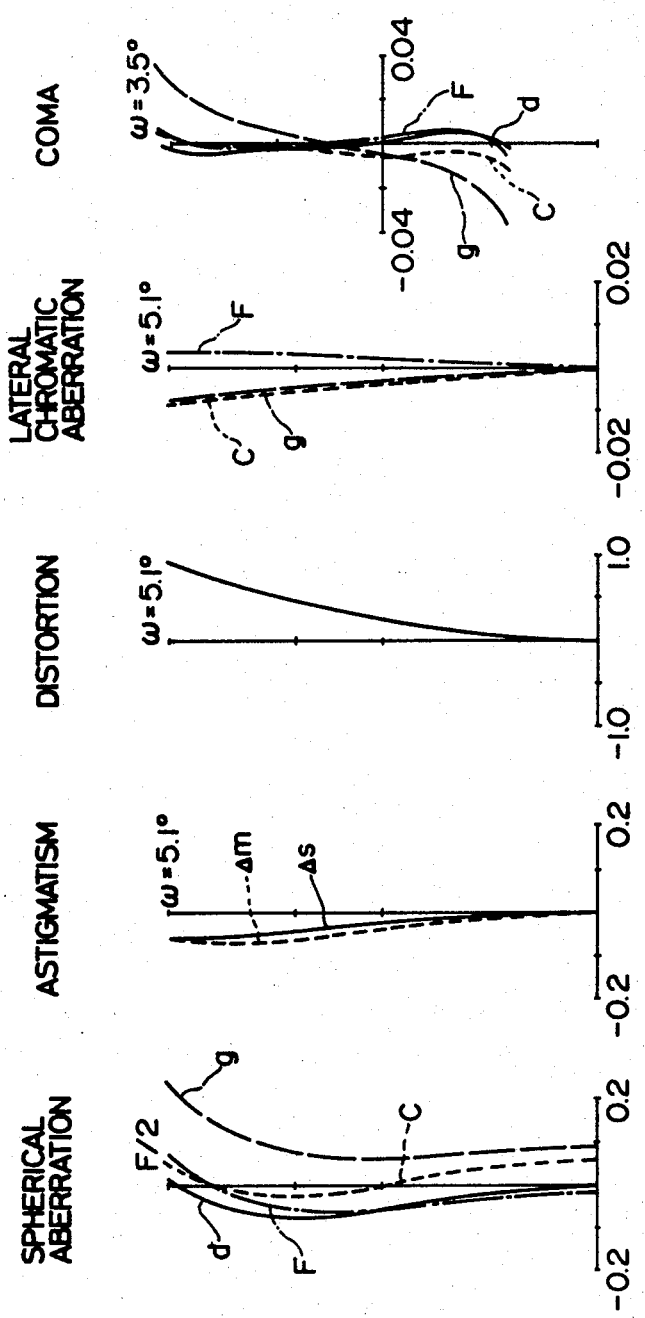
Figure 17:
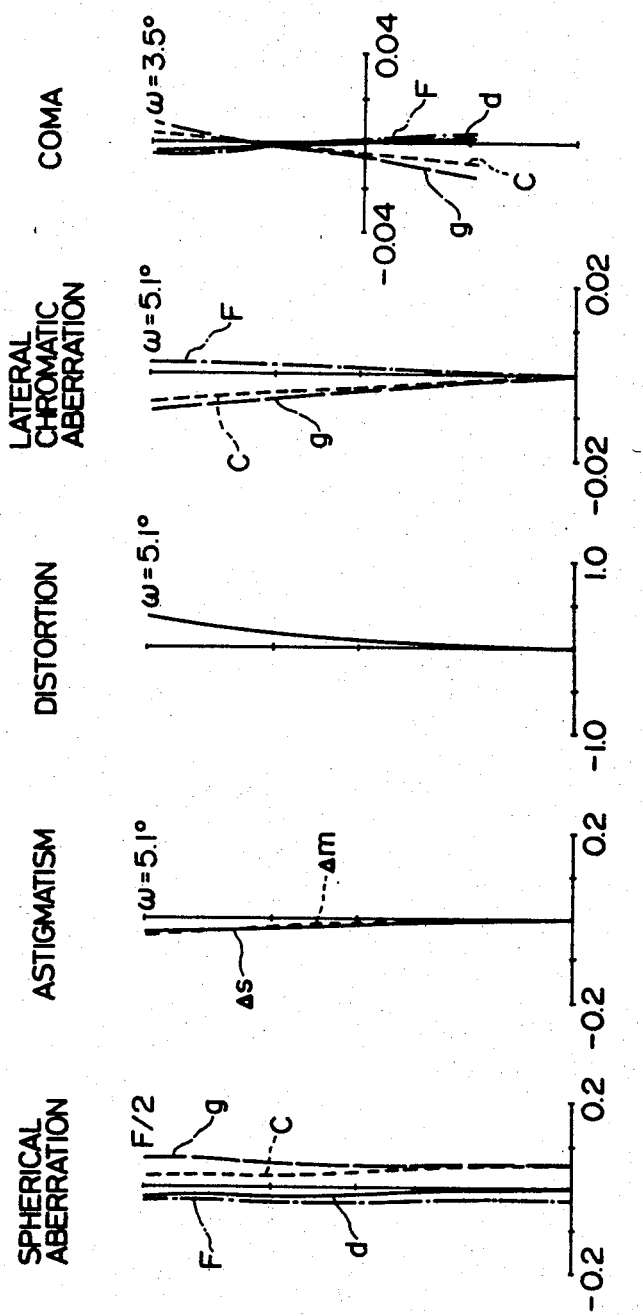
FIG. 17 through FIG. 19 show curves illustrating the aberration characteristics of a sixth embodiment of the present invention.
Figure 18:
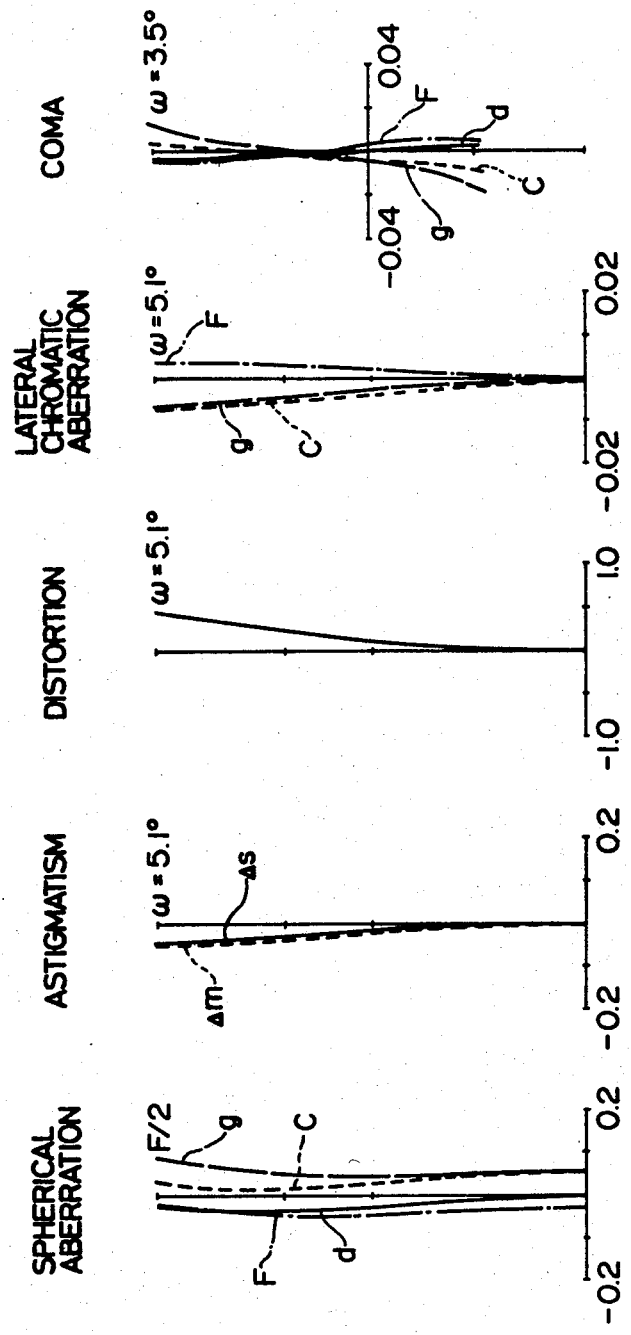
Figure 19:
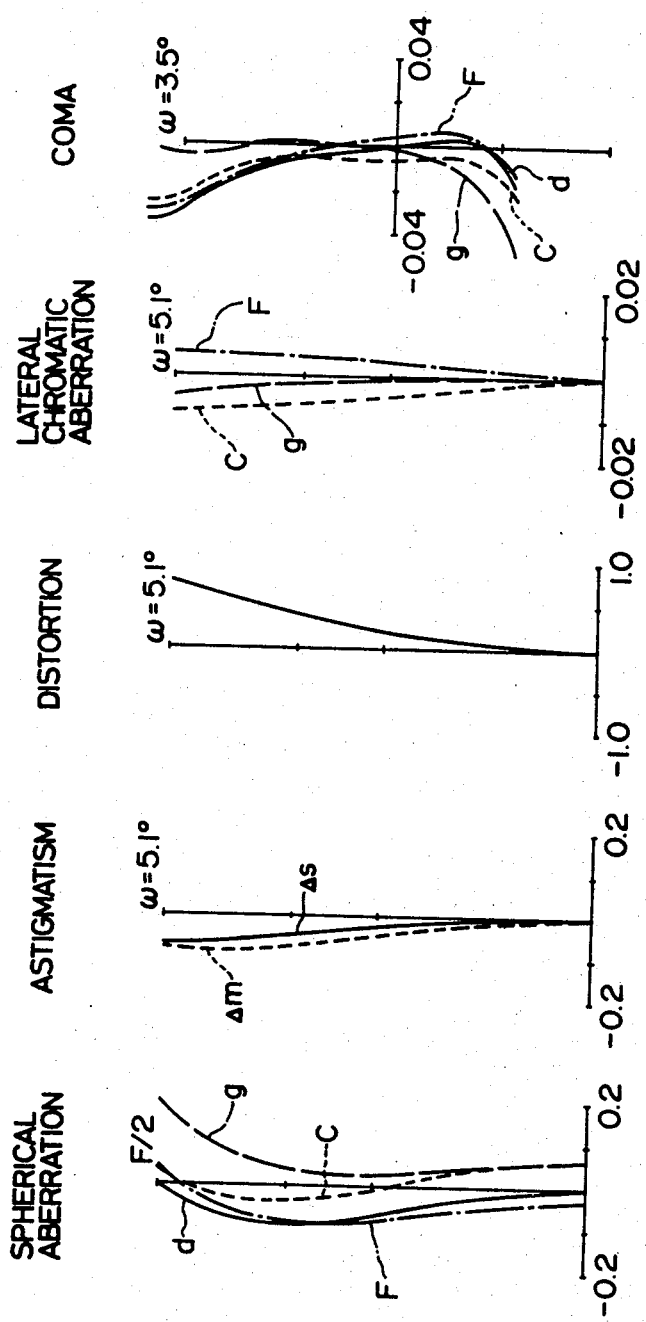
Figure 20:
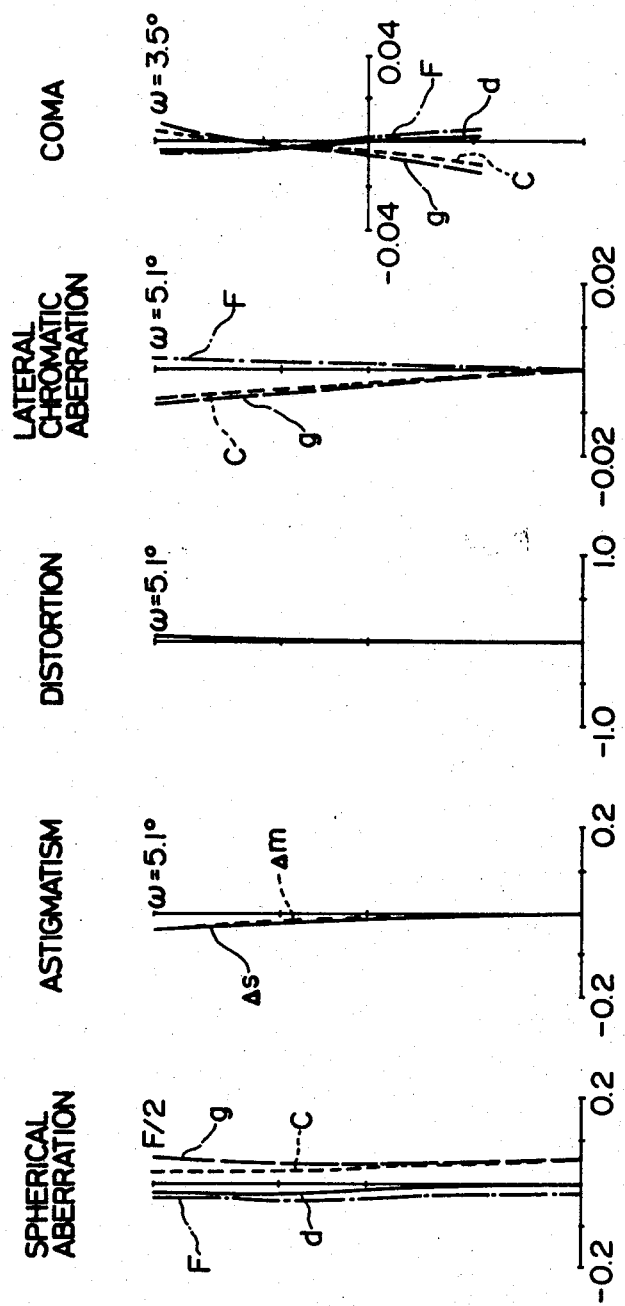
FIG. 20 through FIG. 22 show curves illustrating the aberration characteristics of a seventh embodiment of the present invention.
Figure 21:
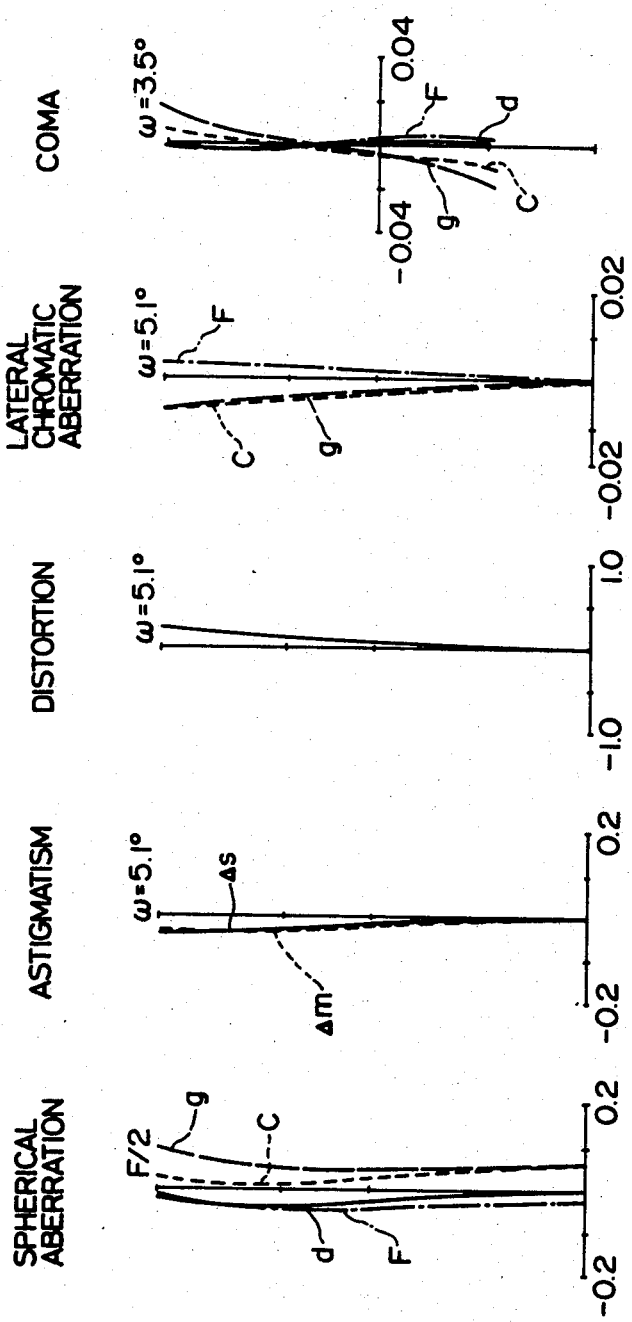
Figure 22:
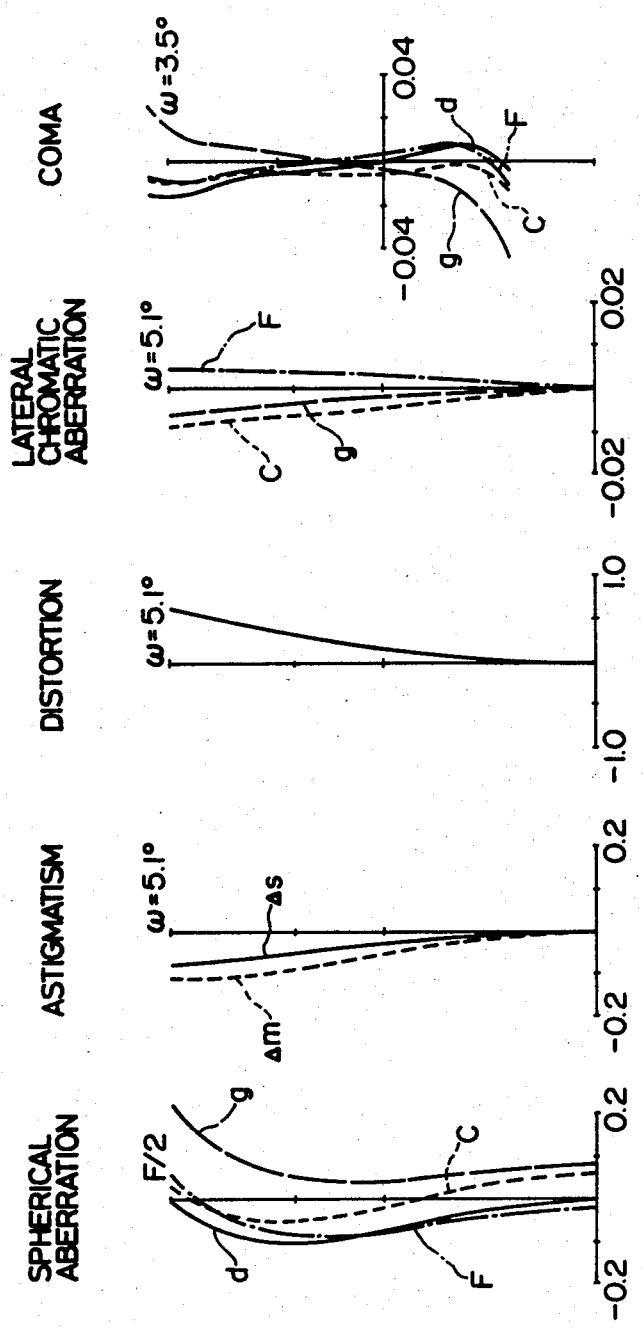

Aberration characteristics of the individual embodiments are illustrated in FIG. 2 through FIG. 22. FIG. 2 shows the aberration characteristics of the lens system set forth as Embodiment 1 when it is focused on an object located at infinite distance, FIG. 3 shows the aberration characteristics of the Embodiment 1 when it is focused on an object located at a distance of 3.05 m (magnification approximately 1/30), and FIG. 4 shows the aberration characteristics of Embodiment 1 when it is focused on an object located at a distance of 0.99 m (magnification approximately 1/10). FIG. 5 shows the aberration characteristics of Embodiment 2 when it is focused on an object located at infinite distance, FIG. 6 shows the aberration characteristics of Embodiment 2 when it is focused on an object located at a distance of 3.05 m, and FIG. 7 shows the aberration characteristics of Embodiment 2 when it is focused at a distance of 0.99 m. FIG. 8 shows the aberration characteristics of Embodiment 3 when it is focused on an object located at infinite distance, FIG. 9 shows the aberration characteristics of Embodiment 3 when it is focused on an object located at a distance of 3.05 m, and FIG. 10 shows the aberration characteristics of Embodiment 3 when it is focused on an object located at a distance of 0.99 m. FIG. 11 shows the aberration characteristics of Embodiment 4 when it is focused on an object located at infinite distance, FIG. 12 shows the aberration characteristics of Embodiment 4 when it is focused on an object located at a distance of 3.05 m, and FIG. 13 shows the aberration characteristics of Embodiment 4 when it is focused on an object located at a distance of 0.99 m. FIG. 14 shows the aberration characteristics of Embodiment 5 when it is focused on an object located at infinite distance, FIG. 15 shows the aberration characteristics of Embodiment 5 when it is focused on an object located at a distance of 3.05 m, and FIG. 16 shows the aberration characteristics of Embodiment 5 when it is focused on an object located at a distance of 0.99 m. FIG. 17 shows the aberration characteristics of Embodiment 6 when it is focused on an object located at infinite distance, FIG. 18 shows the aberration characteristics of Embodiment 6 when it is focused at a distance of 3.05 m, and FIG. 19 shows the aberration characteristics of Embodiment 6 when it is focused on an object located at a distance of 0.99 m. FIG. 20 shows the aberration characteristics of Embodiment 7 when it is focused on an object located at infinite distance, FIG. 21 shows the aberration characteristics of Embodiment 7 when it is focused on an object located at a distance of 3.05 m, and FIG. 22 shows the aberration characteristics of Embodiment 7 when it is focused on an object located at a distance of 0.99 m.

The aberration characteristic curves of Embodiments 4 through 7 were determined with a rear filter made of a plane parallel plate having thickness of 1.0 mm, refractive index of 1.51633 and Abbe's number of 64.1 placed at the position shown in FIG. 1.

In Embodiments 4, 5 and 6 of all the embodiments described above, large values of $n_{11} - n_{10}$ were selected for minimizing Petzval's sum and other purposes.

I claim:

1. A large relative aperture telephoto lens system comprising a first converging lens group comprising a positive lens component, a positive lens component, a negative lens component and a positive lens component, a diverging lens group comprising two negative cemented doublet lens components and a second converging lens group comprising a positive lens component, a negative lens component and a positive lens component, and so designed as to perform focusing while favorably correcting aberrations by displacing the two negative cemented doublet lens components independently of each other toward the image side while varying the airspace reserve therebetween in said diverging lens group and additionally displacing said second converging lens group independently of both said cemented doublet lens components.

2. A large relative aperture telephoto lens system according to claim 1 satisfying the following conditions (1) through (3):
   (1) $0.08 < n_5 - n_6$
   (2) $10 < \nu_8 - \nu_7 < 45$ $$(3)\ 0.4 f < \left( \frac{1}{f_5} + \frac{1}{f_6} \right)^{-1} < 0.55 f$$

wherein the reference symbols $n_5$ and $n_6$ represent refractive indices of the two elements respectively of the negative lens component arranged on the object side in the diverging lens group, the reference symbols $\nu_7$ and $\nu_8$ designate Abbe's numbers of the two elements respectively of the negative lens component arranged on the image side in the diverging lens group, the reference symbol $f_5$ denotes focal length of the negative lens component arranged on the object side in the diverging lens group, the reference symbol $f_6$ represents focal length of the negative lens component arranged on the image side in the diverging lens group, and the reference symbol f designated focal length of the entire lens system as a whole.

3. A large relative aperture telephoto lens system according to claim 2 satisfying the following conditions (4) through (6):
   (4) $0.08 < n_7 - n_8$
   (5) $0.1 < n_9 - n_{10}$
   (6) $10 < \nu_{11} - \nu_{10}$
   wherein the reference symbols $n_7$ and $n_8$ represents refractive indices of the two elements respectively of the lens component arranged on the image side in the diverging lens group, the reference symbols $n_9$ and $n_{10}$ designate refractive indices of the positive lens component arranged on the object side and the negative lens component respectively in the second converging lens group, and the reference symbols $\nu_{10}$ and $\nu_{11}$ denote Abbe's numbers of the negative lens component and positive lens element arranged on the image side in the second converging lens group.

4. A large relative aperture telephoto lens system according to claim 3 having the following numerical data:

| | | |
|---|---|---|
| $r_1 = 84.4449$ | | |
| $d_1 = 5.7732$ | $n_1 = 1.60311$ | $\nu_1 = 60.70$ |
| $r_2 = -274.9210$ | | |
| $d_2 = 0.2058$ | | |
| $r_3 = 46.2913$ | | |
| $d_3 = 8.2474$ | $n_2 = 1.49700$ | $\nu_2 = 81.61$ |
| $r_4 = 318.5034$ | | |
| $d_4 = 2.8866$ | | |
| $r_5 = -735.4117$ | | |
| $d_5 = 3.2990$ | $n_3 = 1.64769$ | $\nu_3 = 33.80$ |
| $r_6 = 43.7536$ | | |
| $d_6 = 1.2367$ | | |
| $r_7 = 52.4491$ | | |
| $d_7 = 6.1856$ | $n_4 = 1.49700$ | $\nu_4 = 81.61$ |
| $r_8 = 584.2215$ | | |
| $d_8 = D_1$ | | |
| $r_9 = -78.4683$ | | |
| $d_9 = 2.8866$ | $n_5 = 1.78590$ | $\nu_5 = 44.18$ |
| $r_{10} = -41.7171$ | | |
| $d_{10} = 2.8866$ | $n_6 = 1.51823$ | $\nu_6 = 58.96$ |
| $r_{11} = 51.8208$ | | |
| $d_{11} = D_2$ | | |
| $r_{12} = 433.9990$ | | |
| $d_{12} = 3.2990$ | $n_7 = 1.74950$ | $\nu_7 = 35.27$ |
| $r_{13} = -55.2372$ | | |
| $d_{13} = 2.4742$ | $n_8 = 1.51633$ | $\nu_8 = 64.15$ |
| $r_{14} = 33.7825$ | | |
| $d_{14} = D_3$ | | |
| $r_{15} = 56.4859$ | | |
| $d_{15} = 3.2990$ | $n_9 = 1.77250$ | $\nu_9 = 49.66$ |
| $r_{16} = -47.7808$ | | |
| $d_{16} = 1.2538$ | | |
| $r_{17} = -42.3250$ | | |
| $d_{17} = 1.2371$ | $n_{10} = 1.60342$ | $\nu_{10} = 38.01$ |
| $r_{18} = 29.2522$ | | |
| $d_{18} = 2.8866$ | $n_{11} = 1.58913$ | $\nu_{11} = 60.97$ |
| $r_{19} = -127.8522$ | | |

$f = 100,\ 2\omega = 10.2°,\ f_5 = -72.9$ $$f_6 = -109.3,\ \left( \frac{1}{f_5} + \frac{1}{f_6} \right)^{-1} = 43.73$$

wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

5. A large relative aperture telephoto lens system according to claim 3 having the following numerical data:

| | | |
|---|---|---|
| $r_1 = 83.1647$ | | |
| $d_1 = 6.8041$ | $n_1 = 1.60311$ | $\nu_1 = 60.70$ |
| $r_2 = -279.9293$ | | |
| $d_2 = 0.2058$ | | |
| $r_3 = 47.5582$ | | |
| $d_3 = 7.4227$ | $n_2 = 1.49700$ | $\nu_2 = 81.61$ |
| $r_4 = 172.7366$ | | |
| $d_4 = 2.8866$ | | |
| $r_5 = -543.0752$ | | |
| $d_5 = 3.2990$ | $n_3 = 1.64769$ | $\nu_3 = 33.80$ |
| $r_6 = 47.8211$ | | |
| $d_6 = 2.4743$ | | |
| $r_7 = 58.4210$ | | |
| $d_7 = 5.3608$ | $n_4 = 1.49700$ | $\nu_4 = 81.61$ |
| $r_8 = -415.0663$ | | |
| $d_8 = D_1$ | | |
| $r_9 = -80.3192$ | | |

| | | |
|---|---|---|
| $d_9 = 3.5876$ | $n_5 = 1.74950$ | $\nu_5 = 35.27$ |
| $r_{10} = -42.4378$ | | |
| $d_{10} = 2.8866$ | $n_6 = 1.51633$ | $\nu_6 = 64.15$ |
| $r_{11} = 53.9175$ | | |
| $d_{11} = D_2$ | | |
| $r_{12} = 580.1772$ | | |
| $d_{12} = 3.5052$ | $n_7 = 1.78590$ | $\nu_7 = 44.18$ |
| $r_{13} = -53.8577$ | | |
| $d_{13} = 2.4742$ | $n_8 = 1.51823$ | $\nu_8 = 58.96$ |
| $r_{14} = 34.0644$ | | |
| $d_{14} = D_3$ | | |
| $r_{15} = 54.0398$ | | |
| $d_{15} = 3.2990$ | $n_9 = 1.77250$ | $\nu_9 = 49.66$ |
| $r_{16} = -44.9532$ | | |
| $d_{16} = 1.2538$ | | |
| $r_{17} = -39.7583$ | | |
| $d_{17} = 1.2371$ | $n_{10} = 1.60342$ | $\nu_{10} = 38.01$ |
| $r_{18} = 32.3847$ | | |
| $d_{18} = 2.8866$ | $n_{11} = 1.58913$ | $\nu_{11} = 60.97$ |
| $r_{19} = -187.5967$ | | |
| $f = 100, 2\omega = 10.2°, f_5 = -73.7$ | | |

$$f_6 = -114.9, \left(\frac{1}{f_5} + \frac{1}{f_6}\right)^{-1} = 44.90$$

wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

6. A large relative aperture telephoto lens system according to claim 3 having the following numerical data:

| | | |
|---|---|---|
| $r_1 = 69.3417$ | | |
| $d_1 = 7.4227$ | $n_1 = 1.60311$ | $\nu_1 = 60.70$ |
| $r_2 = -291.6597$ | | |
| $d_2 = 0.2021$ | | |
| $r_3 = 46.8848$ | | |
| $d_3 = 6.8041$ | $n_2 = 1.49700$ | $\nu_2 = 81.61$ |
| $r_4 = 190.0616$ | | |
| $d_4 = 2.8866$ | | |
| $r_5 = -498.7464$ | | |
| $d_5 = 3.2990$ | $n_3 = 1.64769$ | $\nu_3 = 33.80$ |
| $r_6 = 43.0165$ | | |
| $d_6 = 2.4739$ | | |
| $r_7 = 55.7931$ | | |
| $d_7 = 5.3608$ | $n_4 = 1.49700$ | $\nu_4 = 81.61$ |
| $r_8 = -2099.8307$ | | |
| $d_8 = D_1$ | | |
| $r_9 = -87.5570$ | | |
| $d_9 = 3.5876$ | $n_5 = 1.80440$ | $\nu_5 = 39.58$ |
| $r_{10} = -44.4242$ | | |
| $d_{10} = 2.8866$ | $n_6 = 1.51633$ | $\nu_6 = 64.15$ |
| $r_{11} = 60.3373$ | | |
| $d_{11} = D_2$ | | |
| $r_{12} = 2187.0425$ | | |
| $d_{12} = 3.5052$ | $n_7 = 1.74950$ | $\nu_7 = 35.27$ |
| $r_{13} = -51.3497$ | | |
| $d_{13} = 2.4742$ | $n_8 = 1.51454$ | $\nu_8 = 54.69$ |
| $r_{14} = 31.5584$ | | |
| $d_{14} = D_3$ | | |
| $r_{15} = 50.3768$ | | |
| $d_{15} = 3.2990$ | $n_9 = 1.77250$ | $\nu_9 = 49.66$ |
| $r_{16} = -52.4982$ | | |
| $d_{16} = 1.2545$ | | |
| $r_{17} = -45.4461$ | | |
| $d_{17} = 1.2371$ | $n_{10} = 1.60342$ | $\nu_{10} = 38.01$ |
| $r_{18} = 29.4799$ | | |
| $d_{18} = 2.8866$ | $n_{11} = 1.58913$ | $\nu_{11} = 60.97$ |
| $r_{19} = -183.9024$ | | |
| $f = 100, 2\omega = 10.2°, f_5 = -88.2$ | | |

$$f_6 = -88.9, \left(\frac{1}{f_5} + \frac{1}{f_6}\right)^{-1} = 44.27$$

wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

7. A large relative aperture telephoto lens system according to claim 3 having the following numerical data:

| | | |
|---|---|---|
| $r_1 = 67.6668$ | | |
| $d_1 = 7.8350$ | $n_1 = 1.60311$ | $\nu_1 = 60.70$ |
| $r_2 = -249.6781$ | | |
| $d_2 = 0.2019$ | | |
| $r_3 = 46.1550$ | | |
| $d_3 = 6.3918$ | $n_2 = 1.49700$ | $\nu_2 = 81.61$ |
| $r_4 = 201.1326$ | | |
| $d_4 = 3.0928$ | | |
| $r_5 = -397.5636$ | | |
| $d_5 = 3.0928$ | $n_3 = 1.64769$ | $\nu_3 = 33.80$ |
| $r_6 = 42.9978$ | | |
| $d_6 = 2.8864$ | | |
| $r_7 = 66.2145$ | | |
| $d_7 = 4.9485$ | $n_4 = 1.49700$ | $\nu_4 = 81.61$ |
| $r_8 = 3864.6596$ | | |
| $d_8 = D_1$ | | |
| $r_9 = -109.1493$ | | |
| $d_9 = 3.5876$ | $n_5 = 1.70154$ | $\nu_5 = 41.21$ |
| $r_{10} = -46.5350$ | | |
| $d_{10} = 2.8866$ | $n_6 = 1.49831$ | $\nu_6 = 65.03$ |
| $r_{11} = 111.3747$ | | |
| $d_{11} = D_2$ | | |
| $r_{12} = 437.1910$ | | |
| $d_{12} = 3.5052$ | $n_7 = 1.58144$ | $\nu_7 = 40.75$ |
| $r_{13} = -56.9916$ | | |
| $d_{13} = 2.4742$ | $n_8 = 1.49831$ | $\nu_8 = 65.03$ |
| $r_{14} = 30.3915$ | | |
| $d_{14} = D_3$ | | |
| $r_{15} = 98.7285$ | | |
| $d_{15} = 3.0928$ | $n_9 = 1.77250$ | $\nu_9 = 49.66$ |
| $r_{16} = -36.9204$ | | |
| $d_{16} = 1.2368$ | | |
| $r_{17} = -34.1713$ | | |
| $d_{17} = 1.2371$ | $n_{10} = 1.60342$ | $\nu_{10} = 38.01$ |
| $r_{18} = 27.4803$ | | |
| $d_{18} = 3.0928$ | $n_{11} = 1.73400$ | $\nu_{11} = 51.49$ |
| $r_{19} = -239.0432$ | | |
| $f = 100, 2\omega = 10.2°, f_5 = -152.6$ | | |

$$f_6 = -74.1, \left(\frac{1}{f_5} + \frac{1}{f_6}\right)^{-1} = 49.88$$

wherein the reference symbols $r_1$ through $r_{19}$ represent radii of curvature on the surfaces of the respective lens elements, the reference symbols $d_1$ through $d_{18}$ designate thicknesses of the respective lens elememts and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

8. A large relative aperture telephoto lens system according to claim 3 having the following numerical data:

| | | | |
|---|---|---|---|
| $r_1 =$ 71.1487 | | | |
| | $d_1 = 7.4227$ | $n_1 = 1.60311$ | $\nu_1 = 60.70$ |
| $r_2 =$ −304.2733 | | | |
| | $d_2 = 0.2021$ | | |
| $r_3 =$ 45.9101 | | | |
| | $d_3 = 6.7216$ | $n_2 = 1.49700$ | $\nu_2 = 81.61$ |
| $r_4 =$ 232.0865 | | | |
| | $d_4 = 3.0928$ | | |
| $r_5 =$ −777.1552 | | | |
| | $d_5 = 3.0928$ | $n_3 = 1.63980$ | $\nu_3 = 34.48$ |
| $r_6 =$ 39.8462 | | | |
| | $d_6 = 2.8863$ | | |
| $r_7 =$ 52.5987 | | | |
| | $d_7 = 5.0309$ | $n_4 = 1.49700$ | $\nu_4 = 81.61$ |
| $r_8 =$ 573.8540 | | | |
| | $d_8 = D_1$ | | |
| $r_9 =$ −100.2201 | | | |
| | $d_9 = 3.5876$ | $n_5 = 1.73400$ | $\nu_5 = 51.49$ |
| $r_{10} =$ −51.9273 | | | |
| | $d_{10} = 2.8866$ | $n_6 = 1.46450$ | $\nu_6 = 65.94$ |
| $r_{11} =$ 75.8864 | | | |
| | $d_{11} = D_2$ | | |
| $r_{12} =$ 670.3402 | | | |
| | $d_{12} = 3.5052$ | $n_7 = 1.68893$ | $\nu_7 = 31.08$ |
| $r_{13} =$ −71.3273 | | | |
| | $d_{13} = 2.4742$ | $n_8 = 1.49831$ | $\nu_8 = 65.03$ |
| $r_{14} =$ 30.9974 | | | |
| | $d_{14} = D_3$ | | |
| $r_{15} =$ 76.0739 | | | |
| | $d_{15} = 3.0928$ | $n_9 = 1.77250$ | $\nu_9 = 49.66$ |
| $r_{16} =$ −39.7415 | | | |
| | $d_{16} = 1.2372$ | | |
| $r_{17} =$ −36.8061 | | | |
| | $d_{17} = 1.2371$ | $n_{10} = 1.60342$ | $\nu_{10} = 38.01$ |
| $r_{18} =$ 28.3367 | | | |
| | $d_{18} = 3.0928$ | $n_{11} = 1.67790$ | $\nu_{11} = 55.33$ |
| $r_{19} =$ −232.1710 | | | |
| | $f = 100,\ 2\omega = 10.2°,\ f_5 = -120.6$ | | |

$$f_6 = -81.6,\ \left(\frac{1}{f_5} + \frac{1}{f_6}\right)^{-1} = 48.67$$

wherein the reference symbols $r_1$ through $r_{19}$ represent radii of curvature on the surfaces of the resective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

9. A large relative aperture telephoto lens system according to claim 3 having the following numerical data:

| | | | |
|---|---|---|---|
| $r_1 =$ 72.7504 | | | |
| | $d_1 = 7.6289$ | $n_1 = 1.60311$ | $\nu_1 = 60.70$ |
| $r_2 =$ −245.9035 | | | |
| | $d_2 = 0.2019$ | | |
| $r_3 =$ 47.2477 | | | |
| | $d_3 = 6.3918$ | $n_2 = 1.49700$ | $\nu_2 = 81.61$ |
| $r_4 =$ 189.6996 | | | |
| | $d_4 = 3.0928$ | | |
| $r_5 =$ −370.9012 | | | |
| | $d_5 = 3.0928$ | $n_3 = 1.64769$ | $\nu_3 = 33.80$ |
| $r_6 =$ 46.0426 | | | |
| | $d_6 = 2.8865$ | | |
| $r_7 =$ 61.6026 | | | |
| | $d_7 = 5.1546$ | $n_4 = 1.49700$ | $\nu_4 = 81.61$ |
| $r_8 =$ −657.3048 | | | |
| | $d_8 = D_1$ | | |
| $r_9 =$ −100.7518 | | | |
| | $d_9 = 3.5876$ | $n_5 = 1.58144$ | $\nu_5 = 40.75$ |
| $r_{10} =$ −38.1598 | | | |
| | $d_{10} = 2.8866$ | $n_6 = 1.49831$ | $\nu_6 = 65.03$ |
| $r_{11} =$ 64.6174 | | | |
| | $d_{11} = D_2$ | | |
| $r_{12} =$ 496.3340 | | | |
| | $d_{12} = 3.5052$ | $n_7 = 1.77250$ | $\nu_7 = 49.66$ |
| $r_{13} =$ −47.8045 | | | |
| | $d_{13} = 2.4742$ | $n_8 = 1.49831$ | $\nu_8 = 65.03$ |
| $r_{14} =$ 31.0905 | | | |
| | $d_{14} = D_3$ | | |
| $r_{15} =$ 68.4992 | | | |
| | $d_{15} = 3.2990$ | $n_9 = 1.77250$ | $\nu_9 = 49.66$ |
| $r_{16} =$ −58.7903 | | | |
| | $d_{16} = 1.2368$ | | |
| $r_{17} =$ −55.9273 | | | |
| | $d_{17} = 1.2371$ | $n_{10} = 1.60342$ | $\nu_{10} = 38.01$ |
| $r_{18} =$ 29.0038 | | | |
| | $d_{18} = 2.8866$ | $n_{11} = 1.69680$ | $\nu_{11} = 55.52$ |
| $r_{19} =$ −708.7012 | | | |
| | $f = 100,\ 2\omega = 10.2°,\ f_5 = -87.5$ | | |

$$f_6 = -117.5,\ \left(\frac{1}{f_5} + \frac{1}{f_6}\right)^{-1} = 50.15$$

wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

10. A large relative aperture telephoto lens system according to claim 3 having the following numerical data:

| | | | |
|---|---|---|---|
| $r_1 =$ 64.7809 | | | |
| | $d_1 = 7.4227$ | $n_1 = 1.60311$ | $\nu_1 = 60.70$ |
| $r_2 =$ −294.1265 | | | |
| | $d_2 = 0.2018$ | | |
| $r_3 =$ 46.7129 | | | |
| | $d_3 = 6.8041$ | $n_2 = 1.49700$ | $\nu_2 = 81.61$ |
| $r_4 =$ 165.2799 | | | |
| | $d_4 = 2.8866$ | | |
| $r_5 =$ −430.2552 | | | |
| | $d_5 = 3.2990$ | $n_3 = 1.64769$ | $\nu_3 = 33.80$ |
| $r_6 =$ 41.6846 | | | |
| | $d_6 = 2.4741$ | | |
| $r_7 =$ 57.1426 | | | |
| | $d_7 = 5.3608$ | $n_4 = 1.49700$ | $\nu_4 = 81.61$ |
| $r_8 =$ −1693.4893 | | | |
| | $d_8 = D_1$ | | |
| $r_9 =$ −92.0511 | | | |
| | $d_9 = 3.5876$ | $n_5 = 1.80440$ | $\nu_5 = 39.58$ |
| $r_{10} =$ −46.4336 | | | |
| | $d_{10} = 2.8866$ | $n_6 = 1.51633$ | $\nu_6 = 64.15$ |
| $r_{11} =$ 70.1068 | | | |
| | $d_{11} = D_2$ | | |
| $r_{12} =$ 587.6749 | | | |
| | $d_{12} = 3.5052$ | $n_7 = 1.74950$ | $\nu_7 = 35.27$ |
| $r_{13} =$ −51.8366 | | | |
| | $d_{13} = 2.4742$ | $n_8 = 1.51454$ | $\nu_8 = 54.69$ |
| $r_{14} =$ 29.6134 | | | |
| | $d_{14} = D_3$ | | |
| $r_{15} =$ 48.4709 | | | |
| | $d_{15} = 3.2990$ | $n_9 = 1.77250$ | $\nu_9 = 49.66$ |
| $r_{16} =$ −56.7397 | | | |
| | $d_{16} = 1.2367$ | | |
| $r_{17} =$ −51.4269 | | | |
| | $d_{17} = 1.2371$ | $n_{10} = 1.60342$ | $\nu_{10} = 38.01$ |
| $r_{18} =$ 27.7018 | | | |
| | $d_{18} = 2.8866$ | $n_{11} = 1.58913$ | $\nu_{11} = 60.97$ |
| $r_{19} =$ −366.8054 | | | |
| | $f = 100,\ 2\omega = 10.2°,\ f_5 = -100.5$ | | |

-continued $$f_6 = -88.0, \left(\frac{1}{f_5} + \frac{1}{f_6}\right)^{-1} = 46.92$$

wherein the reference symbols $r_1$ through $r_{19}$ represent radii of curvature on the surfaces of the respective lens elements, the reference symbols $d_1$ through $d_{18}$ designate thicknesses of the respective lens elements and airspaces reserved therebetween, the reference symbols $n_1$ through $n_{11}$ denote refractive indices of the respective lens elements, and the reference symbols $\nu_1$ through $\nu_{11}$ represent Abbe's numbers of the respective lens elements.

* * * * *